United States Patent
Clarke

(10) Patent No.: US 6,402,725 B1
(45) Date of Patent: Jun. 11, 2002

(54) MOLDED ARTICLE—SHAPES

(75) Inventor: Peter Reginald Clarke, Petworth West Sussex (GB)

(73) Assignee: Coraltech Limited, Hampshire (GB)

(*) Notice: Subject to any disclaimer, the term of this patent is extended or adjusted under 35 U.S.C. 154(b) by 0 days.

(21) Appl. No.: 09/284,660

(22) PCT Filed: Oct. 16, 1997

(86) PCT No.: PCT/GB97/02765

§ 371 (c)(1),
(2), (4) Date: Apr. 16, 1999

(87) PCT Pub. No.: WO98/17456

PCT Pub. Date: Apr. 30, 1998

Related U.S. Application Data

(60) Provisional application No. 60/031,364, filed on Nov. 19, 1996, provisional application No. 60/031,401, filed on Nov. 20, 1996, and provisional application No. 60/036,816, filed on Feb. 3, 1997.

(30) Foreign Application Priority Data

| Oct. 17, 1996 | (GB) | 9621624 |
| Oct. 17, 1996 | (GB) | 9621626 |
| Nov. 20, 1996 | (GB) | 9624162 |
| Jan. 6, 1997 | (GB) | 9700138 |
| Sep. 2, 1997 | (GB) | 9718632 |

(51) Int. Cl.$^7$ .......................... A61M 35/00; B25G 1/00; B26B 29/02
(52) U.S. Cl. .......................... 604/295; 30/322; 30/324; 30/340; 30/346; 224/232
(58) Field of Search .................. 30/340, 346; 224/232; 604/294, 295; 264/37.14, 37.16, 37.25, 37.31, 37.33

(56) References Cited

U.S. PATENT DOCUMENTS 3,505,435 A * 4/1970 Schmidt
4,215,166 A * 7/1980 Bussey, Jr.

FOREIGN PATENT DOCUMENTS

EP 0061131 * 9/1982

* cited by examiner

Primary Examiner—Kim M. Lewis
(74) Attorney, Agent, or Firm—Ware, Fressola, Van Der Sluys & Adolphson LLP

(57) ABSTRACT

A cup of plastics material incorporating foaming agents has thin wall portions, namely a base (101), a lower side wall (102) and an upper side wall (103). These portions have their wall thickness determined by mold part gap. The cup also has thick wall portions, namely the corner (104), the band (105) and the rim (106), in which foaming occurs after mold opening so that the wall thickness is increased beyond that provided by the mold.

54 Claims, 17 Drawing Sheets

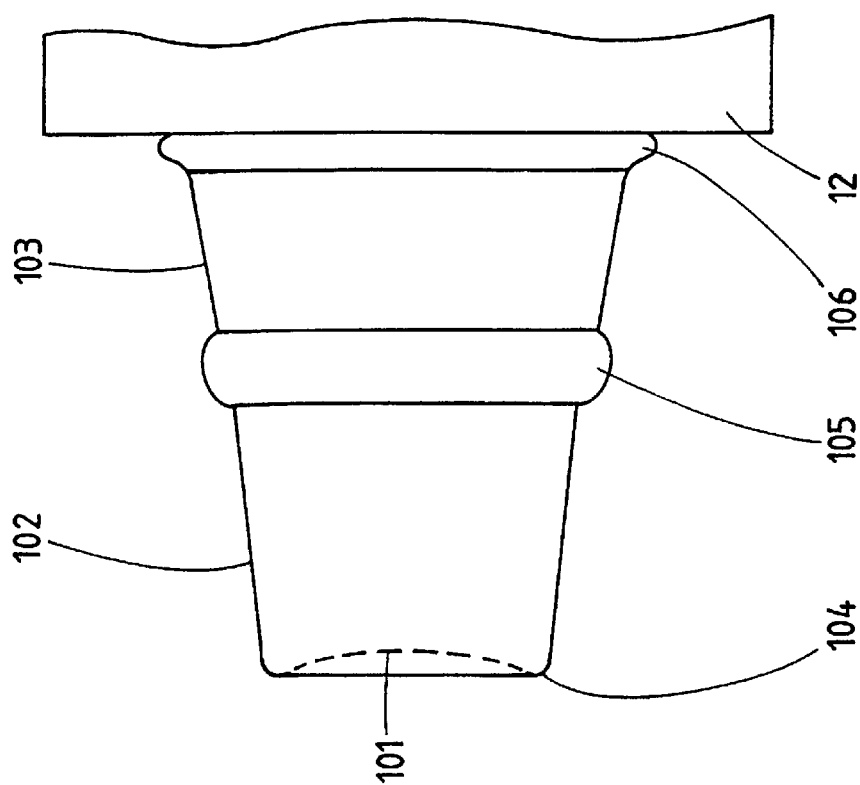
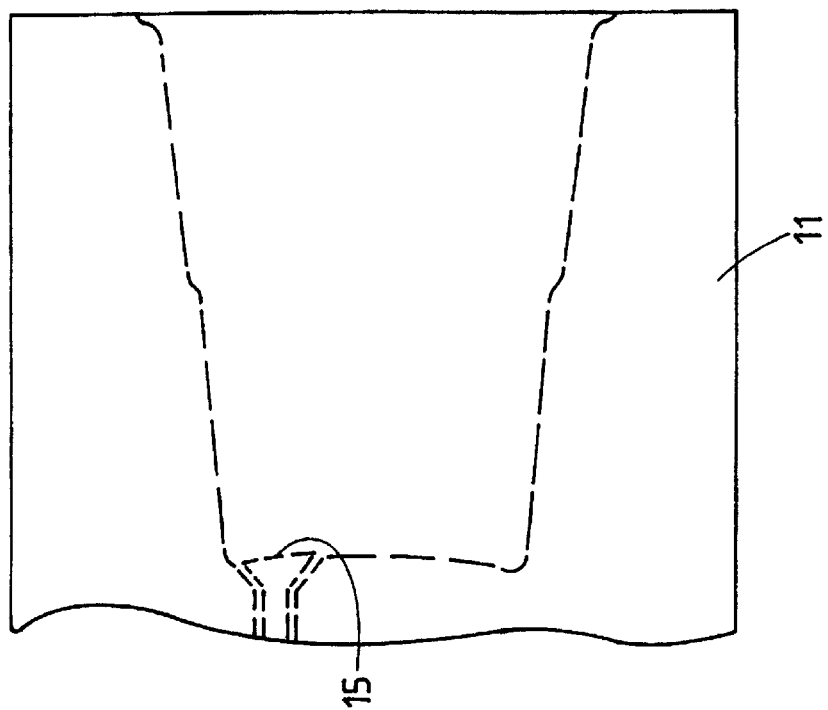
Figure 4

11(i)       11(ii)

11(iii)      11(iv)

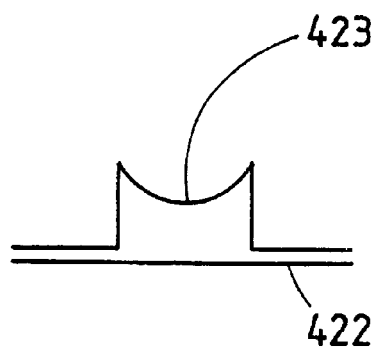
12(i)
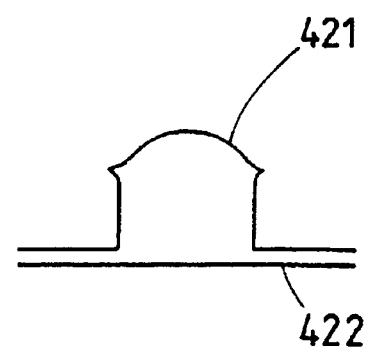
12(ii)
Figure 12

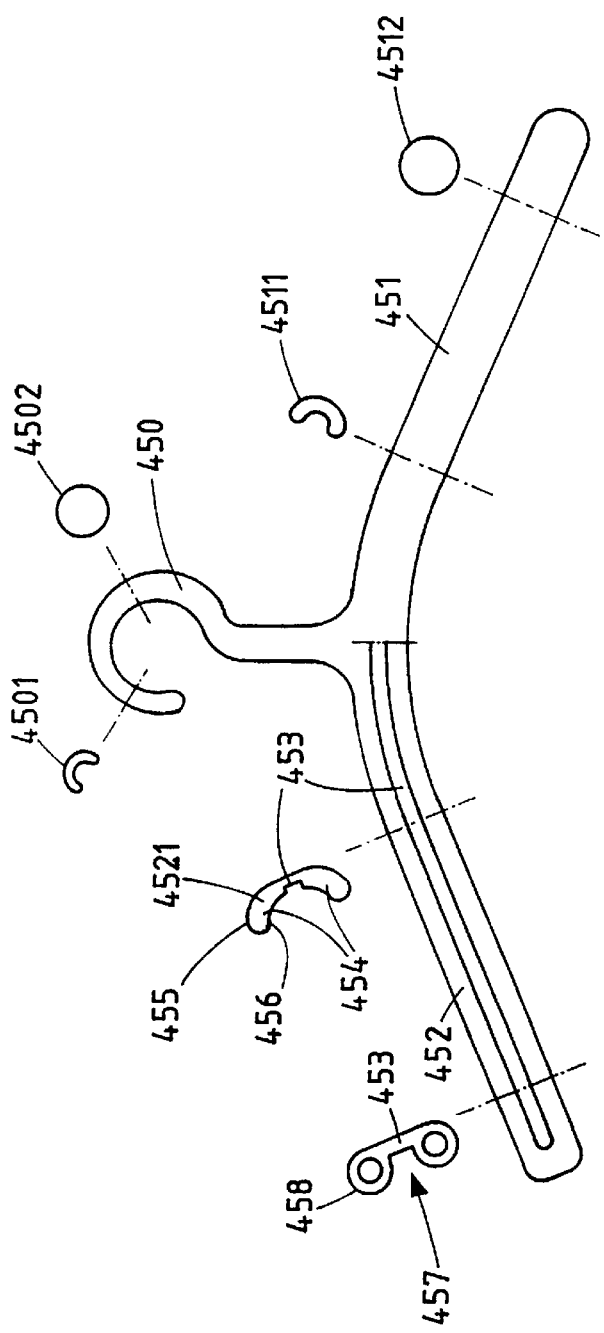
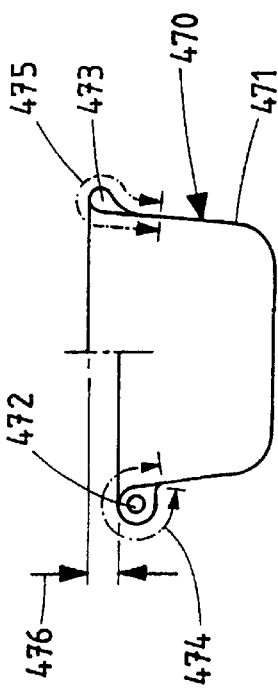
Figure 13
Figure 14

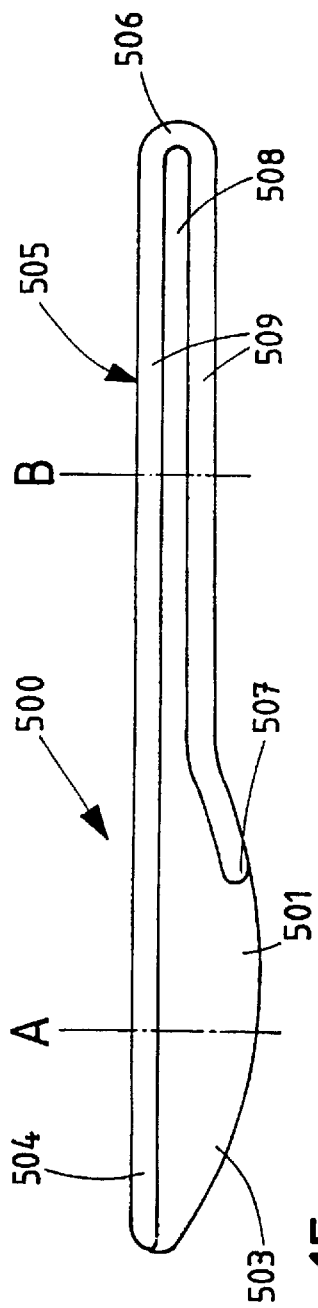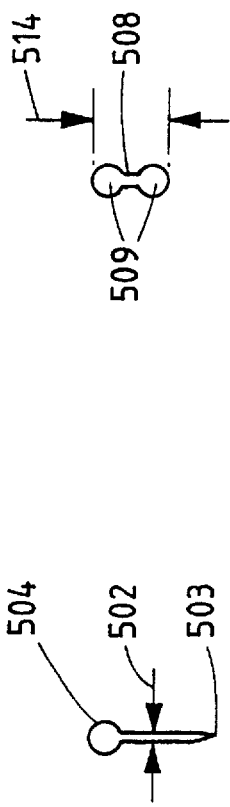
Figure 15
Figure 15a
Figure 15b
Figure 16a
Figure 16b

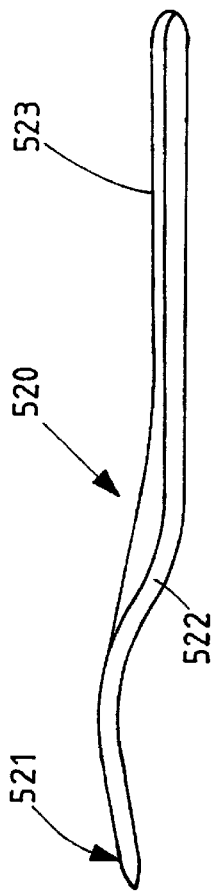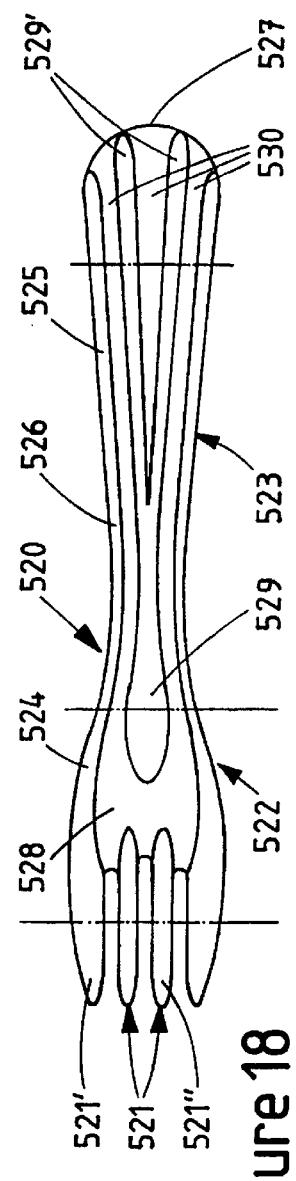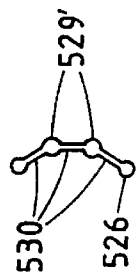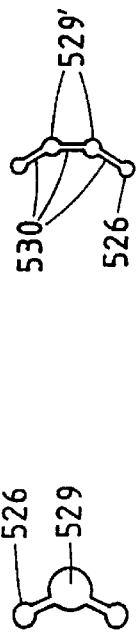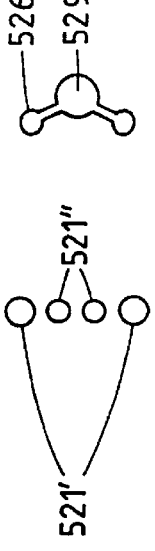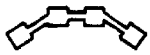
Figure 17
Figure 18
Fig.19a
Fig.19b
Fig.19c
Fig.20a
Fig.20b
Fig.20c

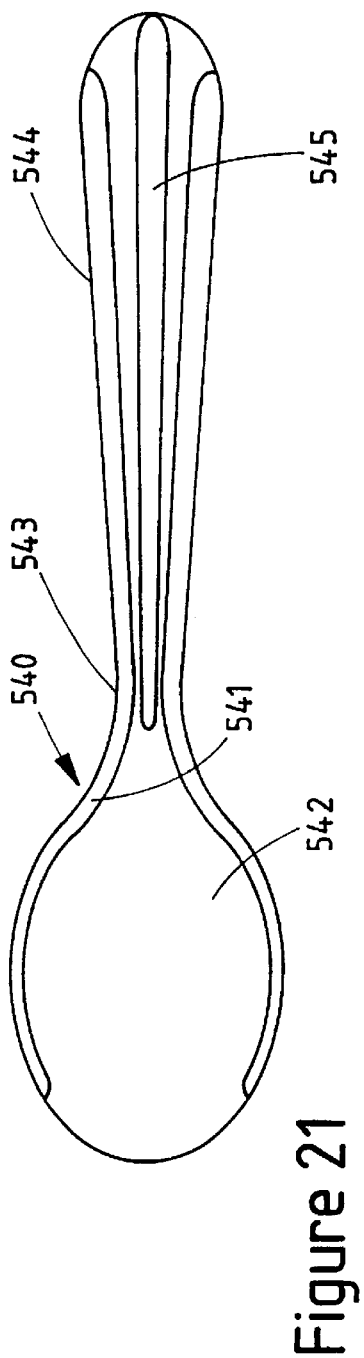
Figure 21
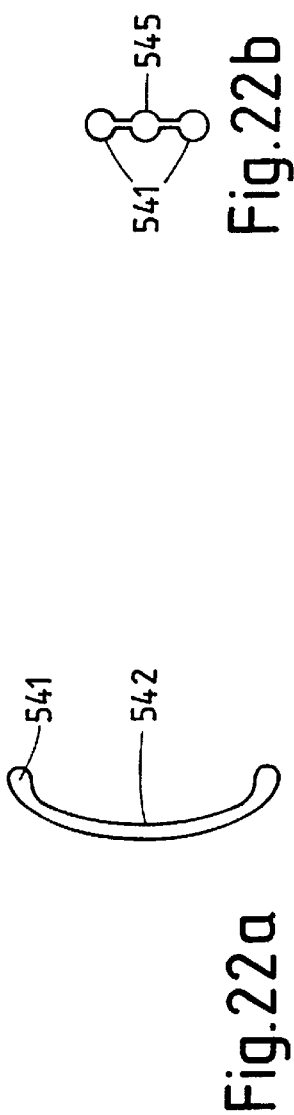
Fig. 22a
Fig. 22b
Fig. 23a
Fig. 23b

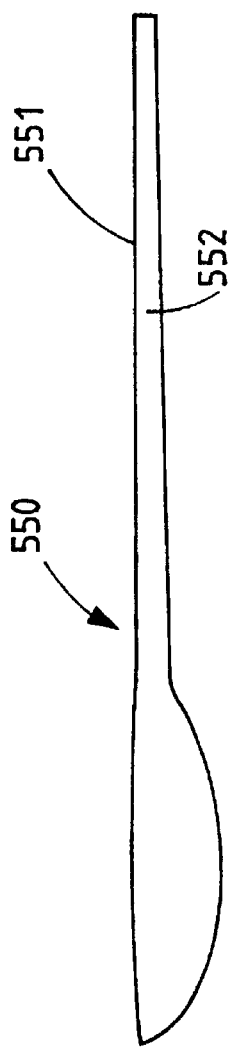
Figure 24
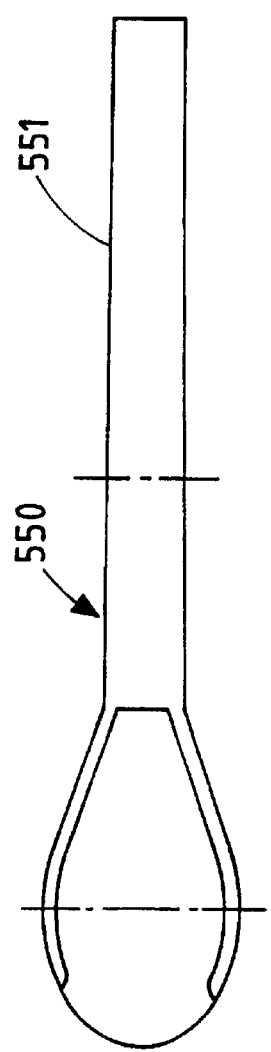
Figure 25
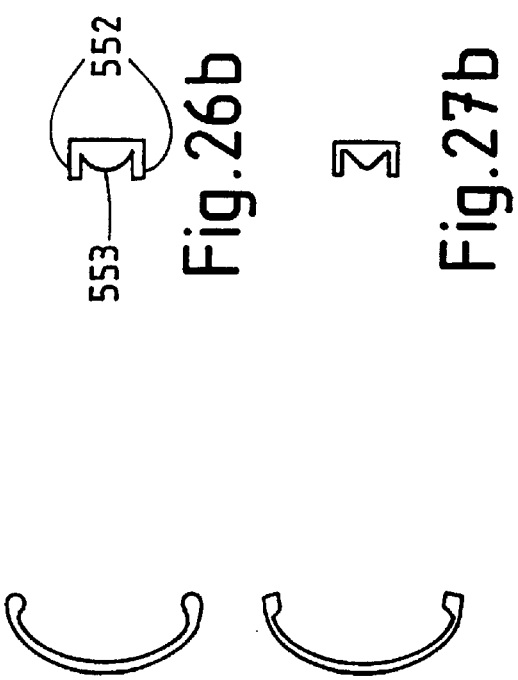
Fig. 26a Fig. 26b
Fig. 27a Fig. 27b

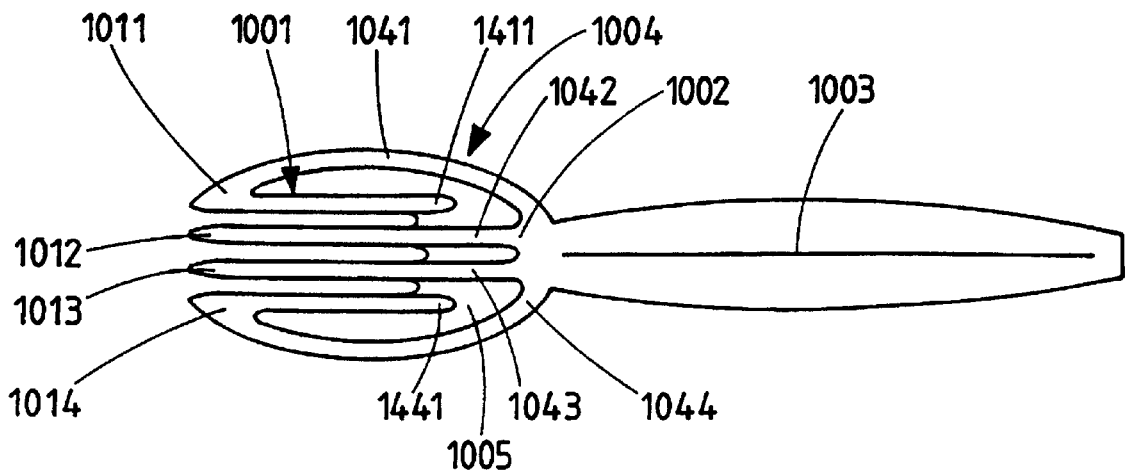
Figure 33
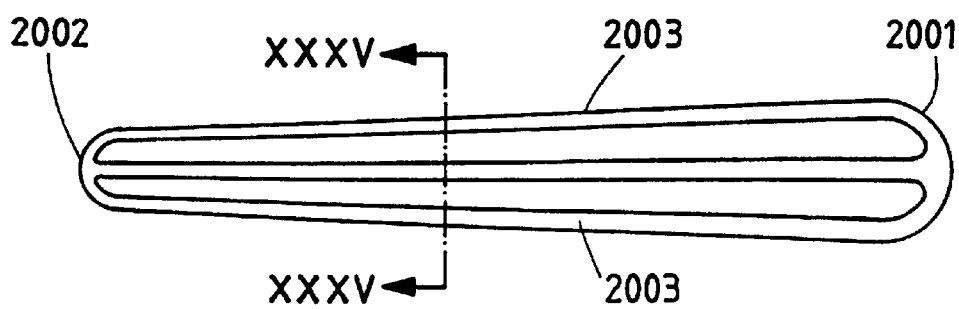
Figure 34
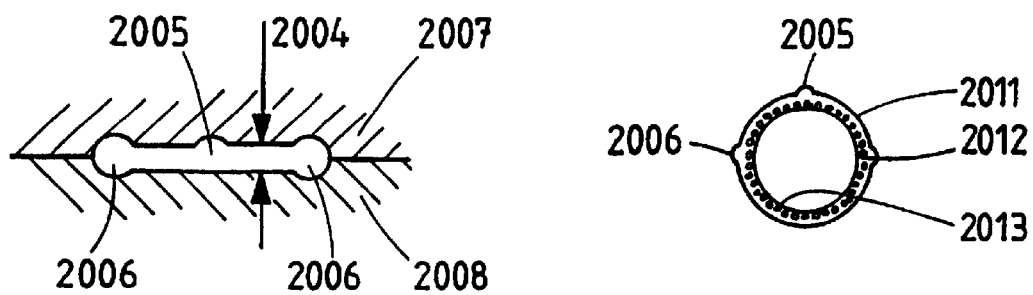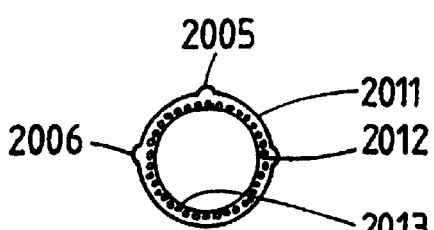
Figure 35               Figure 38

MOLDED ARTICLE— SHAPES

This application is a national stage application filed under 35 USC 371 of PCT/GB97/02765 which has the international filing date of Oct. 16, 1997 and claims the benefit of 60/031,364 filed Nov. 19, 1996, 60/031,401 filed Nov. 20, 1996 and 60/036,816 filed Feb. 3, 1997.

TECHNICAL FIELD

The present invention relates to a method of forming an article via injection of plastics materials into a mould.

BACKGROUND OF THE INVENTION

It should be emphasised that in this specification, including the claims, the meaning of the term "blowing agent" encompasses both "chemical blowing agents" and "physical blowing agents". A chemical blowing agent comprises at lest one compound which breaks down in molten plastics material to mix gas into the material. A physical blowing agent is a gas or a liquid—at room temperature and pressure—or mixed with the molten material. Chemical blowing agents are added to the plastics material in the hopper of material fed to an injection moulding machine's plasticising screw. Physical blowing agents can be mixed with the plastics material as described in my UK patent applications Nos. 9702977.1 and 9706682.3, respectively dated Feb. 13 and Apr. 2, 1997. These are still unpublished. However, the mechanism for producing a mixture of blowing agent and plastics material forms no part of this invention, which is concerned with production of articles using such mixtures. Generally, the blowing agent as such will add negligibly to the volume[1] of the material when being processed within an injection moulding machine due to the elevated pressure within the machine. However, when the pressure is released to substantially lower pressure, such as room pressure, and the plastics material is still molten, the blowing agent acts to expand the material by the blowing voids of varying sizes in the material.

[1] Chemical blowing agents are usually bound into a carrier of other plastics material which has its own bulk.

A recognised problem, in injection moulding from plastics materials of articles having thin walls in particular, is that at marked differences in cross-section, differential shrinkage causes blemishes in the finished surface of the article.

Despite this problem, many new designs of injection moulded articles could be feasible if marked changes in cross-section were possible, without shrinkage blemishes.

BRIEF DESCRIPTION OF DRAWINGS DIRECTED TO MY ORIGINAL METHOD

The following applications describe my basic invention having the object of providing an improved method based on injection moulding and facilitating the production of substantial changes in cross-section:

British Patent Application No. 9514674.2

U.S. Patent Application No. 60/017,386

International Patent Application No. PCT/GB96/01706, now published under No WO 97/03800.

In these applications I describe and/or claim (as proposed to be amended):

A method of forming an article via injection of plastics material into a mould, the finish formed article having thin wall portion(s) and thick wall portion(s), the thick wall portion(s) being at least partially foamed, the method consisting in the steps of:

providing a mould tool defining in its closed state, between its cavity part and its core part, narrow gap portion(s) whose mould part gap is to be substantially reproduced in the thin wall portion(s) of the article and wide gap portion(s) whose mould part gap is less than the thickness of the thick wall portion(s) of the finish formed article;

closing the mould tool to define the narrow and wide gap portions;

injecting a plastics material mixture comprising a basic polymer and a foam producing additive into the mould tool;

allowing the plastics material mixture to at least substantially solidify in the narrow gap portions of the mould tool to produce the thin wall portions of the finish formed article;

withdrawing at least a portion of one part of the mould tool from the other part before the plastics material mixture has at least substantially solidified in the wide gap portion(s) of the mould tool to allow the mixture to expand by foaming and form at least some of the thick wall portion(s) of the finish formed article; and ejecting the article from the mould tool.

This method is hereinafter referred to as "My Original Method".

To help understanding of My Original Method its first embodiment will now be described with reference to the following of the accompanying drawings, in which:

FIG. 1 is a cross-sectional side view of an injection moulded cup able to be moulded with a mould using a technique, which appears to be known;

FIG. 2 is a similar view of a cup formed in accordance with My Original Method;

FIG. 3 is a similar view of a mould tool for preliminary moulding of the cup;

FIG. 4 is a side similar view of the mould tool open for foaming of thick wall sections of the cup on the core of the mould tool.

Referring first to FIG. 1, the cup has a base 1, a lower side wall 2 and an upper side wall 3, these being thin wall portions. At the corner 4 between the base and the lower side wall, at a band 5 between the upper and lower side walls and at the rim 6 there a thick wall portions. Typically the thin wall portions are 0.7 mm thick and the thick wall portions are 1.2 mm thick.

This cup could be moulded with conventional plastics materials, but due to the different wall sections, shrinkage marks could be expected to appear in the thick wall portions. In other words, conventional moulding techniques result in uneven wall thickness in the thick wall portions.

I discovered that I can mould the cup with even wall thickness in the thick wall portions, by including a small amount of chemical blowing agent in the plastics material. Despite having originally believed this to be a new technique, it appears that this may be known.

In this basic technique, I used plastics material comprising free flowing polypropylene with a small addition of blowing agent, typically less than 5% and in the region of 1%, in accordance with the directions of the suppliers of the SAFOAM agent, Reedy International Corporation of Keyport, N.J., USA. In the thick wall portions, the agent causes foaming, whilst in the thin wall portions no foaming occurs. The degree of foaming can be controlled by adjustment of injection parameters such as pressure, time, temperature, quantity of plastics material and percentage of blowing agent in the material, such adjustments being routinely made in the set up of an injection moulding machine.

I believe that a combination of the higher pressure required to force the material into the thin wall portions and the increased cooling rate in the thin wall portions inhibit the formation of foaming in the thin wall portions, whereas the lower pressure present in the thick wall portions and the greater bulk of plastics material in the thick wall portions requiring longer to cool allow foaming in these portions. Originally I believed that the foaming to fill the thick wall portions of the mould tool cavity needed to occur before opening of the mould. However I was surprised to discover that additional foaming can occur due to opening of the mould before cooling of the thick wall portions to solidification.

My Original Method is based on such use of plastics material including blowing agent to allow foaming expansion to continue after at least partial opening of the mould in which the cup or other article is moulded.

FIG. 2 shows a cup formed in accordance with My Original Method. It has thin wall portions, namely a base 101, a lower side wall 102 and an upper side wall 103, in which no foaming occurs. These portions have their wall thickness determined by the mould part gap. The cup also has thick wall portions, namely the corner 104, the band 105 and the rim 106, in which foaming occurs after mould opening so that the wall thickness is increased beyond that provided by the mould. Compared with the 1.2 mm wall thickness in the band 5, using the same mould, a maximum band wall thickness of 3.2 mm is achievable. It will be noted the outer contour of the band is curved, due to restraint of its upper and lower margins 106, 107 where the wall thickness alters to being thin. On the outer surface 108 between these margins, the band blows out. The outer surface of the rim 106 also bows out. In both these instances, and indeed at the corner 104, the outer surface is substantially solidified on opening of the mould. At the time of the above referenced patent applications, I believed that the outer surface was able to stretch as foaming occurs in the still molten plastics material at the centre of the thick wall portions, to give the shapes shown in FIG. 2. In the cup of FIG. 1, such foaming as occurs, does so against the constraint of the still closed mould. In the cup of FIG. 2, the constraint on the foaming is atmospheric pressure and the skin tension of the outer surface. The shape of the rim outer surface 109 is of particular note, in that the shape in which it originally solidifies is concave. However on foaming, the concave surface has little pressure constraint on it and is blown out over-centre to the convex shape 109. This results in a maximum wall thickness of 2.7 mm despite the vertical extent of the rim being less than that of the band.

It should be noted that the 3:1 thick:thin wall thickness ratio, that is the ratio of thin wall thickness to thick wall thickness prior to foaming after mould opening, is exemplary only and the possible limits on the ratio have not yet been researched.

Turning now to FIG. 3, the mould tool there shown has a cavity 11 and a core 12, the two being separable at a joint line 13. The cavity has an injection point 14 and a spring closed air injection port 15 in the form of a poppet valve. The core has an air injection port 16 opposite the injection port 15, with a free floating valve member closed by pressure in the moulding void.

On injection of the plastics material mixture, the port 16 closes and the moulding void fills. The injection parameters are adjusted such that the material reaches the cup rim 6, without completely filling the void. The blowing agent causes foaming in the thick wall portions. However this does not occur in the thin wall portions, where the pressure required to displace the material is higher and the cooling is quicker. When time has been allowed for the plastics material to at least substantially solidify in the thin wall portions of the mould 1',2',3', corresponding to the base 1, lower wall 2 and upper wall 3 of the cup and for some foaming in the thick wall portions 4',5', 6' of the mould, corresponding to the corner 4, band 5 and rim 6, and before the material has solidified in the thick wall portions, the mould is opened and air pressure applied to the port 15. This separates the moulding from the cavity, and together with shrinkage onto the core, allows withdrawal of the core with the moulding.

The outer surface skins 108, 109, 110 of the material (see FIG. 2) at the thick wall portions 104, 105, 106 have at least substantially solidified, but does not constrain the blowing agent from generating sufficient pressure to create the shapes described above with reference to FIG. 2 and as also shown in FIG. 4. After a further delay to allow the moulding to cool, air is introduced via the port 16. This expands the moulding which is released from and then drops off the core.

FIG. 4 is taken from my International Application No. PCT/GB96/01706. At the time of the application, I had not realised the significance of the present invention. For this reason, FIG. 4 shows the rim 106 abutting the joint face surface of the core part of the tool. When sufficient blowing agent is added to the material of the cup and the cooling time is sufficiently short, for the rim to form to a circular cross-sectional shape, the height of the cup fore-shortens due to the rim skin blowing out and down as its length remains constant. Thus FIG. 4 does not teach the present invention.

I believe that the blowing agent forces the moulding into good thermal contact with the mould at the thick wall portions before opening of the mould. This enhances cooling of the plastics material to form the skins of the thick wall portions. Further use of a carbon dioxide blowing agent which absorbs appreciable energy in foaming, that it cools the material on foaming, is advantageous in quickening cooling. However, both chemical and physical blowing agents using other gases and base polymers other than polypropylene are possible to use in My Original Method.

In British Patent Application No. 9621626.2, from which this application claims priority, I described an improvement of My Original Method.

In the improvement, a substrate is placed into the mould prior to its closure in a position such that the plastics material mixture is injected onto a surface of the substrate, whereby after the withdrawal step the mixture foams on the substrate.

This improvement is hereinafter referred to as "My Substrate Improvement".

I have now realised that the foaming expansion mechanism described in respect of My Original Method is not exactly as I had originally believed, particularly as regards the extent to which the skin in the foamed thick wall portions stretches. The degree of stretch now appears to be very small and limited by solidification of the skin very shortly after the foaming pressure is applied to it. This effect is apparent with My Substrate Improvement where the lack of stretch, but change of cross-sectional shape pulls the substrate into a curve.

In application No. 9621626.2, I anticipated the applicability of My Substrate Improvement to articles having no thin wall portions.

BRIEF DESCRIPTION OF THE DRAWINGS DIRECTED TO MY SUBSTRATE IMPROVEMENT

To help understanding of My Substrate Improvement, its preferred embodiment as described in the application No.

9621626.2 will now be described with reference to FIGS. 5, 6 & 7 of the accompanying drawings, in which:

FIG. 5 is a cross-sectional side view of a mould tool having a substrate placed in it prior to injection of plastics material, FIG. 6 is a similar cross-sectional view of a formed article after foaming of the plastics material on a surface of the substrate and FIG. 7 is a plan view of the formed article.

The mould tool has a cavity part 211 and a core part 212, defining a cuboid cavity 213 having a thin wall section 214, which extends over the major part of the square plan of the cavity, and a thick wall section 215 which extends along one edge of the square. This tool will be understood to be intended for manufacturing samples. The square has 80 mm sides. The thin wall sections are 1.2 mm thick and thick wall section is 4.2 mm thick, that is the core part of the mould has groove 216 3 mm deep and 10 mm wide along one side of the square.

In formation of a sample 221, an 80 mm square of 0.2 mm thick, polyethylene faced card 222 was inserted into the mould, with its face away from the cavity part. Foamable plastics mixture was injected into the cavity via a port 217 in the core part. The card was forced against the core part 211, so that the plastics material formed a 1 mm thick skin 223 across the back of card except at the one edge 224 where the plastics material had an initial thickness of 4 mm.

On opening of the mould, the sample was ejected and the plastics material in the edge allowed to foam to form a ridge 225, whose thickness increased to 9 mm. In so doing it caused the card to adopt a local curvature 226. The plastics thickness across the rest of the card remained 1.0 mm, since the plastics material here had solidified prior to mould opening.

Although not described in application No. 9621626.2, initially I had formed the thick wall section groove 216 with a half round cross-sectional shape. This did not foam to such a marked extent as I expected. It was when the shape was changed to be rectangular that the degree of foaming described was achieved. It should be particularly noted that the degree of foaming shown in FIG. 7 is such that the cross-sectional shape of the ridge 225 is nearly circular and the card has taken up the local curvature 226 tending towards the circular cross-section.

I now believe this to result from the circumferential length of the skin around the thick wall section restraining the degree of foaming expansion. The circumferential length around a rectangle is of course greater than that of an inscribed circle.

The limitation on foaming expansion to the circumferential extent in transverse cross-section of the region of the mould from which the foamed portion of the article is formed renders the process surprisingly predictable.

Therefore, when employing My Original Method, I now prefer to foam the thick wall portions, or the entire object where appropriate, to a substantially circular cross-section, at least where a high stiffness is required (and other constraints do not call for alternative shapes). However, I should emphasise that the expansion to substantially circular cross-section is applicable beyond the differential wall thickness articles of My Original Method.

SUMMARY OF THE INVENTION

Thus in accordance with the present invention, I provide a method of forming an article via injection of plastics material into a mould, the finish formed article having at least one portion expanded, by blowing agent, to a shape which in cross-section is at least substantially circular over at least a substantial part of its circumference, the circumference having a predetermined extent, the method consisting in the steps of:

providing a mould tool defining in its closed state, between opposite parts, at least one region having a circumferential extent around the region in transverse cross-section substantially equal to the predetermined circumference;

closing the mould and injecting a plastics material mixture comprising a basic polymer and a blowing agent into the mould tool;

allowing the plastics material to skin adjacent thereof with an extent substantially equal to the predetermined circumference;

withdrawing at least a portion of one part of the mould tool from the other part before the plastics material mixture has at least substantially solidified at the said region(s) of the mould tool to allow the mixture injected therein to expand by action of the blowing agent to the said at least partially, at least substantially circular shape and form the said portion(s) of the finish formed article; and ejecting the article from the mould tool.

I refer to the article as skinned, but before expansion on mould withdrawal as a "pre-form".

Thus my present invention includes My Substrate Improvement when expansion occurs to the said circular shape.

Whilst I can conceive that the expansion may occur after ejection of the article from the mould tool, normally the expansion will occur before this.

Preferably, the foaming expansion is to an extent whereby the substantially even radius of curvature of the skin is present over a major arc if not the entire circumference of the said portion(s).

Preferably the or each said region is wider than it is thick. In one alternative, the withdrawal step is delayed from a point in the cycle time when the expansion would be to an extent whereby a substantially even radius of curvature of the skin is present over substantially the entire circumference of the article in the said portion(s), whereby the skin stiffens to such extent that edges of the expanded portion substantially reproduce the corresponding edges of the mould region(s), whilst the intervening sides are bowed to at least partial, at least substantially circular shape, the said portion(s) tending to elliptical shape.

In another alternative the expansion occurs against a mould tool surface, whereby the said portion of the finish formed article includes a face from which the transverse section of the portion extends with partially circular curvature.

It should be noted that the said portion(s) may comprise the entire article.

Preferably the mould part gap at the said region(s) will be at least partially elongate, having a constant cross-section.

The said portion(s) may have a thin wall portion at one end. Additionally or alternatively, the portion(s) may have a thin wall portion at one side.

The said region(s) of the mould may have a cross-sectional shape having one or more marked discontinuities of contour, such as a relatively tight radius of curvature, whereby the discontinuities provide a skin circumference length which can be extended with a substantially even and greater radius of curvature on foaming expansion. Examples of such shapes are the rectangular shape of the groove of FIG. 5 above and the tear-drop shape described below. It should be noted that shapes having an appreciable difference in transverse dimension taken normally to each other can be expected to fore-shorten in their longer dimension on foaming expansion.

Alternatively, or additionally, the said region(s) may have a cross-section shape having at least one marked concavity, whereby the corresponding skin concavity can be inverted to provide at least one characteristic dimension of the cross-section of the portion which substantially increases on foaming expansion. Examples of such shapes are alphabetic shapes having marked concavities, such as C, H, I, M/W, U/V, X, Y.

Where a shape having a sharp corner is used, such as a rectangle or an X, the sharp corners are preferably slightly relieved to avoid vestigial traces in the final skin shape.

The or each discontinuity is a tight radius of curvature which is tight compared with that of the transverse cross-section of the corresponding portion of the finish formed article.

Further, the discontinuity can be at a feature of the region(s) causing locally accentuated cooling whereby the feature is locally frozen into the skin at the at least partially, at least substantially circular shape of the said portion of the finish formed article.

Shapes having more than one concavity and a central part of the portion which can act as a reservoir of liquid foaming material provide the greatest scope for increase in overall cross-sectional dimension.

In some embodiments, the or each said region is curved—with a local radius of curvature which is large in comparison with the dimensions of its cross-section—and defines a flange extending radially and at least one laterally facing concavity, whereby the concavity inverts substantially laterally on expansion. Preferably, the or each region defines a web from which the flange extends, the web remaining in cooling contact with one of the mould parts during the expansion. The or each region can include a radially extending rib defining a groove in the or each web on expansion, the rib remaining in cooling contact with its groove.

Where the substantially circular cross-section foamed portion adjoins a thin wall portion, transitional curvature will result. If the foamed portion is biased to be to one side of the thin section, by for instance allowing the foaming expansion to occur with the thin section still in contact with a mould part, the foamed portion will have asymmetric transitional curvature joining opposite sides of it to the thin wall portion.

The method of my present invention is particularly applicable to the production of cutlery. In the preferred embodiments described below, thick wall/foamed portions extend along edges of the handles of the cutlery. Preferably, the thick edge portions have thin portions between them, at least in the handles. The thick portions may extend around the distal end of the handle. Alternatively, the thin, central portions may extend to the distal end of the handles. One or more further thick portions may extend longitudinally of the handle between the edge thick portions.

The thick portions, particularly the edge thick portions, may extend into the "cutlery" part of the cutlery. By "cutlery" part is meant the blade of a knife or prongs of a fork or bowl of a spoon. Further reinforcing thick portions may be provided at the "swan's neck" of a fork or spoon. By "swan's neck" is meant the transition between the cutlery part and the handle. Further, the prongs of a fork may be formed as thick/foamed portions. However, it is likely that other portions of the fork will be thicker/foamed to a greater extent.

In a recent development of the method of my present invention, I have now produced a series of articles, wherein the said portion(s) are foamed to such extent that a void forms at the centre of the portion. The article is in effect hollow in the portion(s).

Where the portion—or one of them in the article—is to be handle, this is a particularly advantageous feature, in that it creates a handle having a body which can be readily gripped. Further since the handle has a considerable moment of inertia, it is stiff and strong.

I have also produced annular hollow portions in the same manner. These also can have considerable stiffness and strength.

If I use a soft plastics material, the hollow portion becomes readily compressible yet resilient due not only to the resilience of the material but also to the gas enclosed within the hollow. I envisage the portion being used as a seal. For instance, a small container with such a hollow portion around its rim could be an eye bath.

Further, I have produced a series of articles in which three phases are present, namely thick and thin portions in accordance with my Original Method, in which the thin portions are unexpanded and the thick portions are expanded but not hollow, and thicker portions still where the opposite skins have separated to leave a hollow, central void. I refer to these phases as:

i. Solid, ii. Cellular[2], iii. Hollow.

[2] I use the term "cellular" in contrast to "foamed", because both the "cellular" and "hollow" phases result from a process of foaming.

There are a number of variables which determine whether a particular portion will become solid, cellular or hollow. For a given material, the determinant of solidity is whether the material has been cooled sufficiently to be solid throughout when the mould is open. No invariable rules can be given for this, nor indeed is it easy to make measurements of solidity on mould opening. It can be deduced by the finished article's wall thickness substantially reproducing the mould part gap. Cooling is enhanced by running the mould as cool as possible and delaying mould opening after injection for sufficient time for solidification. Excess cooling and/or delay in mould opening should be avoided to ensure that foaming expansion on mould opening can occur in the non-solid portion(s).

The chief determinant of a cellular phase is that the cross-sectional shape of the region should be such as to allow the skin to change shape on mould opening, but to a limited extent only. For instance, if the initial skin shape—i.e. the shape of the skin as moulded before foaming expansion—is convex, there is less scope for its inflation to permit expansion of the cross-section. An extreme example is of a circular cross-section initial skin shape. This can inflate only by stretching of the skin, whereby even if the central portion of the plastics material is still molten on mould opening, a small amount only of foaming expansion can occur. Another example is of an equilateral cross-sectional shape. This can inflate by bowing of the sides and moving inwards of the corners, whereby foaming expansion can occur and hence a cellular structure can result.

The chief determinant of a hollow phase is again cross-sectional shape of the region. Creation of a hollow phase requires that the skin should be able to change shape to a much greater extent, such that the cellular structure expands so much that the individual cells burst. For instance, a rectangular shape is likely to expand on foaming expansion to the extent of becoming hollow. The likelihood of this increases with the aspect ratio—i.e. the ratio of the longer sides to the shorter sides—of the rectangle. Again, concavity in the initial skin shape is likely to produce an inflation sufficient to allow foaming expansion to the hollow phase to occur.

A factor influencing the degree to which the skin will inflate is the composition of the plastics material. Materials which will stretch to a greater extent before being inhibited from further stretching by crystallinity and/or biaxial orientation will allow the hollow phase to develop to a greater extent. However, my experience to date in working primarily with polypropylene materials is that cross-sectional shape is a more important design criterion than material nature as regards the creation of hollow or cellular phases.

Whilst the basis of my development has been to produce articles or parts of articles having substantially circular cross-section, I can envisage uses where a flattened circular cross-section would be useful. Particularly, where a greater moment of inertia in one plane than an orthogonal one is required, as for instance in knife handle. To produce such a shape, I envisage partially opening the mould and allowing the expansion to occur against the mould surfaces. Alternatively, it is possible to produce cross-sectional shapes, which whilst tending towards circular are intermediate between the initial skin shape and a circular cross-section. For instance if 5% blowing agent and ½ second cooling time is required to expand a rectangular initial shape to circular, 3% blowing agent and ¾ second cooling time is likely to result in insufficient fluidity in the centre of the moulding and flexibility in the walls for the cross-section to expand to being fully circular. The long sides of the rectangle may bow out to have a substantially even radius of curvature. However the constraints from the short sides and the corners between the sides may be such that the cross-sectional shape is tending to elliptical, or indeed some more complex mathematical shape. At this stage, I have not had the opportunity to analyse the exact curvature.

However, I believe the shape to be tending to be substantially circular or at least substantially elliptical, because if sufficient blowing agent—or other foam producing additive—is included in the plastics material and the mould is opened as soon as the skin has formed then a substantially circular cross-section will result if the initial shape is such as to allow this.

I therefore think in terms of this part of the development having been taken as far as the foaming producing an expanded cross-section having convex curvature tending towards circular, which is absent in the initial skin shape, and a hollow phase within the skin.

I would emphasise that the skin surrounding a hollow phase is likely to be at least partially cellular, with the cell size increasing towards the hollow phase.

There are two factors which appear to have an effect on the extent to which a hollow phase forms. Firstly, I believe that in certain circumstances heat soak has an influence. By heat soak, I mean that the moulding is sufficiently rigid—due to cooling of the skin—on mould opening that expansion is not immediate. Then after a perceptible delay, the moulding grows in size. This appears to be caused by some of the heat in the interior of the moulding, where the material is still molten or at least readily extensible, being transferred out to and warming the skin, softening it and/or the melt layer thickening. The softening/thickening reaches a point where the skin can no longer resist the expansive, internal pressure and the hollow or cellular phase(s) form. This softening is of a diffuse nature. It does not necessarily result in certain moulded features disappearing from the final article. Heat soak can be utilised to encourage expansion to initiate at a specific points, by increasing the cross-section, typically centrally. Once expansion has been initiated it will tend to spread across the moulding.

The second factor is the converse of heat soak, namely the extent to which the moulding is cooled. More cooling will tend to occur at the edges of a moulding having an appreciable aspect ratio. Accentuating cooling can cause features to be "frozen into" the final article. Certain features will tend to be cooled to a greater extent due to tapering to an edge. Such features are more likely to be frozen in.

Within the scope of my development is that I can produce articles having no solid nor cellular phases except in the skin. I can also produce articles which have solid and hollow phases, but no separate skinned cellular phases without hollow interiors. My rule of thumb is that if the degree of expansion—i.e. the increase in transverse dimension—exceeds 5 mm, a void will form.

My present invention can be used for forming articles which do not have respective concave and convex sides, but rather are symmetrical about a central plane, for instance a knife. It may be thought that the mould tool for such articles is not properly to be regarded as having a core part and a cavity part, but rather has two opposite complementary mould parts. I believe that the man skilled in the art will refer to such a mould as having core and cavity parts by analogy with conventional usage. Nevertheless, for the avoidance of doubt as to the scope of the present invention and My Original Method, both cover the use of symmetrical moulds, having mirror image mould cavity defining parts.

Use of such a mould is not described in my International Application No. PCT/GB96/01706, which was published on Feb. 6, 1997. Such use was described in Applications Nos. 9624162.5 and 9700138.2, dated Nov. 20, 1996 and Jan. 6, 1997 respectively, from which this application claims priority. Thus a claim to such use is valid in this application and is included in the claims hereof.

Thus according to this aspect of the invention there is provided:

A method of forming an article via injection of plastics material into a mould, the finish formed article having thin wall portion(s) and thick wall portion(s), the thick wall portion(s) being at least partially foamed, the method consisting in the steps of:

providing a mould tool defining in its closed state, between its two opposite parts, narrow gap portion(s) whose mould part gap is to be substantially reproduced in the thin wall portion(s) of the article and wide gap portion(s) whose mould part gap is less than the thickness of the thick wall portion(s) of the finish formed article, the two opposite mould parts being symmetrical;

closing the mould tool to define the narrow and wide gap portions;

injecting a plastics material mixture comprising a basic polymer and a foam producing additive into the mould tool;

allowing the plastics material mixture to at least substantially solidifying in the narrow gap portions of the mould tool to produce the thin wall portions of the finish formed article;

withdrawing at least a portion of one part of the mould tool from the other part before the plastics material mixture has at least substantially solidified in the wide gap portion(s) of the mould tool to allow the mixture to expand by foaming and form at least some of the thick wall portion(s) of the finish formed article; and ejecting the article from the mould tool.

Further, it may be thought that an article such as a piece of cutlery as opposed to a container is not properly to be regarded as having a thick "wall" portion and a thin "wall" portion. I believe that the man skilled in the art will realise that the term "wall thickness" means the "gauge thickness" (a common term for the thickness of material) or indeed merely the "thickness" of the material, both as defined by the mould part gap and measured in the finish formed article.

It is known to add a variety of fillers to plastics materials used in injection moulding processes. Generally they provide strength and/or hardness improvement, or merely provide economy by bulking the relatively more expensive plastics materials.

However use of fillers in the plastics materials for the present invention provides unexpected advantages.

Accordingly I prefer to add fillers to the plastics material mixture used in my present invention and indeed My Original Method.

Use of talc in particular provides advantages in that it causes the formation of complete voids in the foamed plastics material. This is believed to be caused by talc comprising calcium carbonate platelets. These have relatively sharp edges, which sever the bubble walls formed internally of the foaming plastics material. The result is the formation of a complete void, with a rough internal structure. In turn this causes greater expansion, in that the removal of the internal foam structure allows greater expansion of the thick wall portions of the finish formed article. Greater expansion provides greater transverse dimension and hence greater stiffness.

Further I have noted that fillers tend to migrate to the outer surface of the thick wall portions. Again this increases stiffness.

Furthermore, I have noted that use of fillers increases the time over which foaming occurs. This results in greater dimensional expansion, which in turn enhances stiffness. I believe this effect to be caused by the plastics material incorporating fillers having a greater thermal capacity. This slows cooling and hence allows foaming over a longer period.

I believe the following fillers to be advantageous:

Talc

Chalk

Alumina

Glass spheres

Glass and carbon fibres.

BRIEF DESCRIPTION OF THE DRAWINGS

To help understanding of the invention, specific embodiments thereof will now be described by way of example and with reference to FIGS. 8 to 12 of the accompanying drawings, in which:

FIG. 12 shows similar sections for a reinforcing ridge for a vehicle skin panel;

FIG. 13 shows a garment hanger manufactured in accordance with my in present invention, with scrap details showing cross-sectional shape, the hanger having different left and right arms;

FIG. 14 shows in cross-section an eye bath in accordance with the invention;

FIG. 15 shows a side view of a knife manufactured in accordance with my present invention;

FIGS. 15a and 15b are respective cross-sectional views on the lines A and B in FIG. 15 of the knife showing foamed sections;

FIGS. 16a and 16b are similar views of the "as-moulded" sections prior to foaming expansion;

FIG. 17 shows a side view of a fork manufactured in accordance with my present invention;

FIG. 18 shows a plan view of the fork of FIG. 17;

FIGS. 19a, 19b and 19c are respective cross-sectional views on the lines A, B and C in FIG. 18 of the fork showing foamed sections;

FIGS. 20a, 20b and 20c are similar views of the "as-moulded" sections prior to foaming expansion;

FIG. 21 shows a plan view of a spoon manufactured in accordance with my present invention;

FIGS. 22a and 22b are respective cross-sectional views on the lines A and B in FIG. 21 of the spoon showing foamed sections;

FIGS. 23a and 23b are similar views of the "as-moulded" sections prior to foaming expansion;

FIG. 24 shows a plan view of another spoon manufactured in accordance with my present invention;

FIG. 25 is a plan view of the spoon of FIG. 24;

FIGS. 26a and 26b are respective cross-sectional views on the lines A and B in FIG. 25 of the spoon showing foamed sections;

FIGS. 27a and 27b are similar views of the "as-moulded" sections prior to foaming expansion;

FIG. 33 is a plan view of the fork;

FIG. 34 is a cross-sectional plan view of a mould for a handle;

FIG. 35 is a cross-sectional view on the line XXXV—XXXV in FIG. 34 for the mould.

BEST MODE FOR CARRYING OUT THE INVENTION

Figure 37:
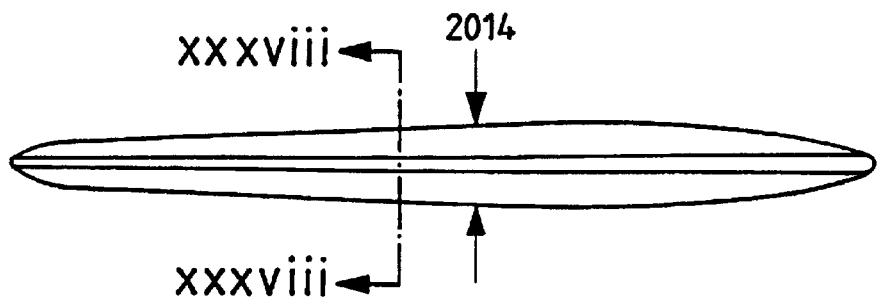
FIG. 37 is a side view of the handle.
Figure 39:
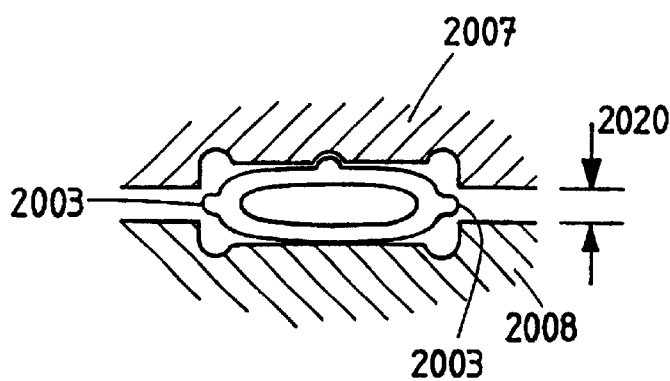
Figure 40:
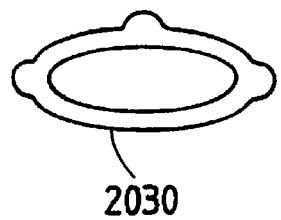

FIG. 38 is a cross-sectional view of the handle at the position corresponding to the line XXXVIII—XXXVIII, showing a circular cross-section;

FIG. 39 is view similar to FIG. 37 of a modified handle being formed to flattened shape;

FIG. 40 is another similar view of an elliptical handle shape; and

Figure 41:
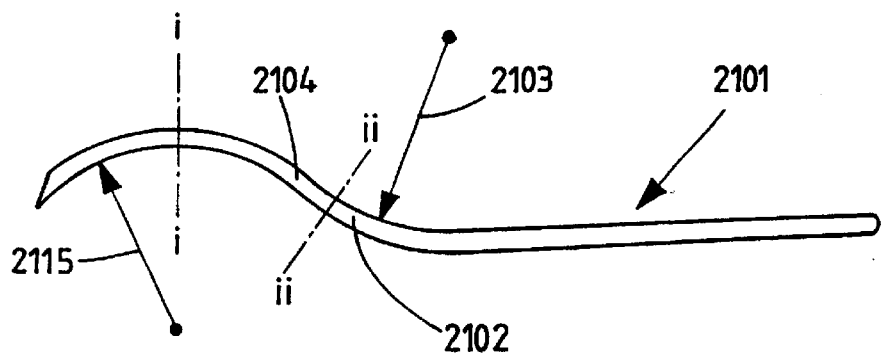
Figure 42:
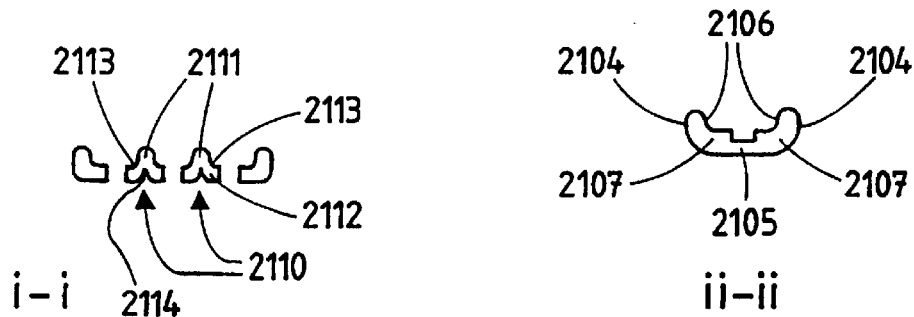
Figure 43:
Figure 44:
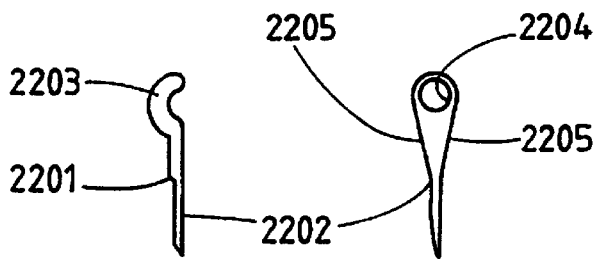

FIGS. 41, 42 and 43 are views similar to FIGS. 17, 19 and 20 of another fork; and FIG. 44 is a cross-sectional view of a pre-form and a corresponding expanded section of a knife blade.

It should be noted that much of the following description is merely of cross-sectional shapes of the mould region(s) whose mould part gap is less than the thickness of the said portion(s) of the finish formed article and the corresponding shapes of the finish formed articles. Moulding of the articles and their foaming expansion can be carried out in accordance with My Original Method, as exemplified with reference to FIGS. 2, 3, & 4.

Figure 8:
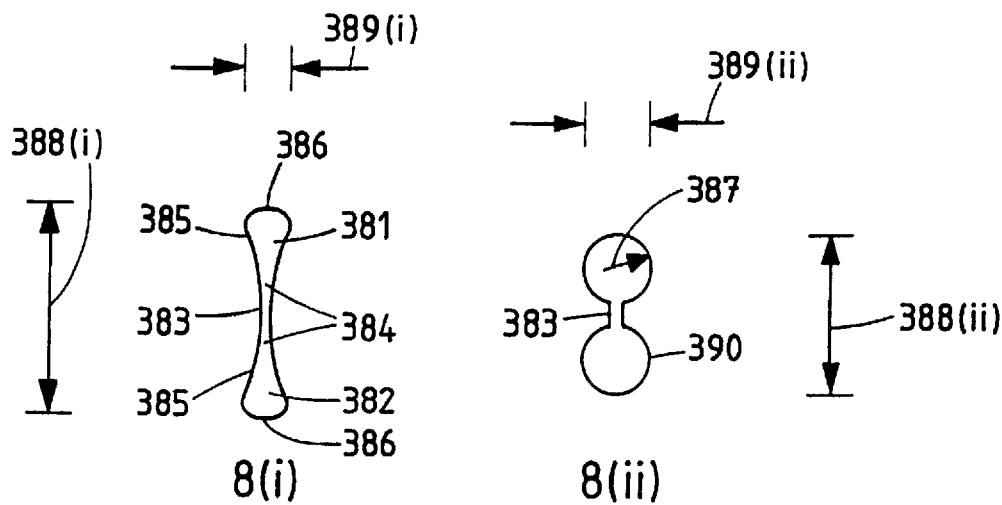
FIG. 8 shows a respective moulded—8(i)—and foamed—8(ii)—section for a cutlery handle.

Turning first to FIG. 8, the mould shape 8(i) in which the cutlery handle skins has double tear drop 381, 382 shape, with a narrow, intervening thin wall portion 383 at the thin ends 384 of the tear drops. These taper 385 out to domed ends 386. The foamed shape 8(ii) retains the intervening thin wall portion 383. However the tapered portions 385 have blown outwards, adopting a substantially constant radius of curvature 387. The domed ends 386 have had their radius of curvature reduced to that of the blown tapers. The overall height 388(i), 388(ii) of the cross-section has fore-shortened on foaming expansion, whilst the width 389(i), 389(ii) has increased. At the junction of the foamed skins 390 and the thin wall portion 383, the opposite skins have been pulled apart and bent so as to extend locally away from each other at the limit of the extension of the still liquid central portion of the plastics material on mould opening. The point at which this occurs in the finished article can be controlled by the degree of cooling of the thin wall portion and the skins, and the timing of mould opening.

Figure 9:
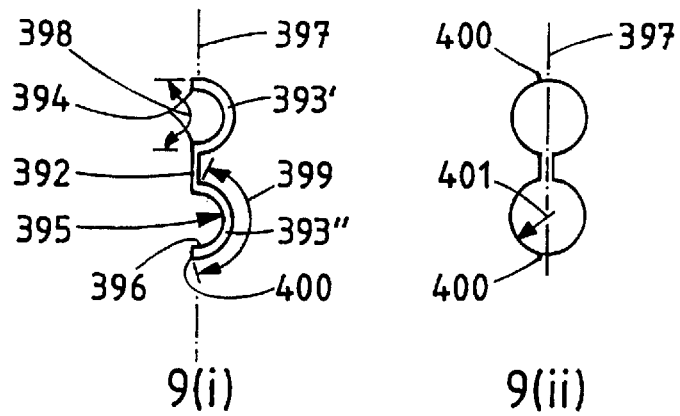
FIG. 9 shows similar sections for another cutlery.

FIG. 9 shows a mould shape 9(i) based on the letter W, with a thin wall portion 392 joining two half round thick wall portions 393', 393". Each of these has a mould part gap approximately double that of the thin wall portion. The corners 394 at the ends of the concave sides 395 of the half round portions are radiused. On foaming expansion, the concave side skins 396 pop over-centre to become convex. Whilst symmetry of the final shape with respect to the medial plane 397 of the thin wall portion, is more definitely assured if the skin length 398 from the thin wall portion via the initially convex skin 399 to the remote corner 400 is the same as that via the concave skin; this is not necessary. The convex skin length 399 is likely to be longer, with the result that the point 400 is drawn out of the medial plane. The skin can be expected to stretch to a limited extent only, so that the radius of curvature 401 of the finish formed handle will be approximately that of the original convex skin.

Figure 10:
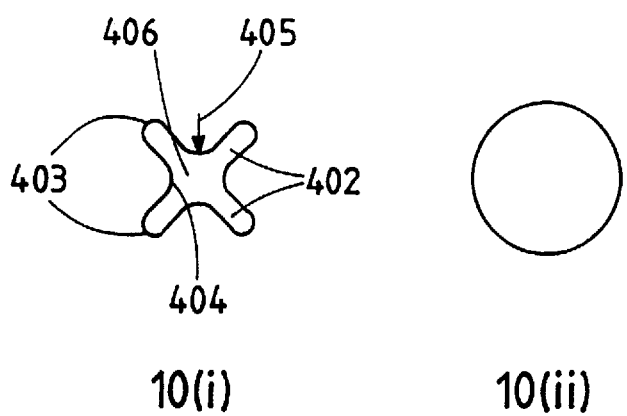
FIG. 10 shows similar sections for an arm of a garment hanger.

FIG. 10 shows a mould shape 10(i), which is based on the letter X. It has no thin wall portion. Each of the four arms 402 of the X has a smooth, tightly radiused end 403. Their roots 404 merge with a larger radius curvature 405, providing a central reservoir 406 of liquid plastics material able to foam after skinning. It will be appreciated that this mould shape provides a relatively large overall circumferential length, so a relatively high degree of volumetric expansion is possible to the foamed shape 10(ii). This is advantageous in providing a rigid arm for a product such as a garment hanger.

It should be noted that all three of the embodiments just described can be incorporated in elongate articles of a length which can be chosen at will. In the case of the cutlery handles, thin wall portions will be incorporated at the end of the handle to provided a blade, for instance for a knife. The garment hanger, on the other hand, may not have a thin wall section. The cross-sectional diameter and the curvature of the central axis of the elongate section can be chosen to suit the garment. It is anticipated that the section can be branched to provide the hook of the hanger.

Figure 11:
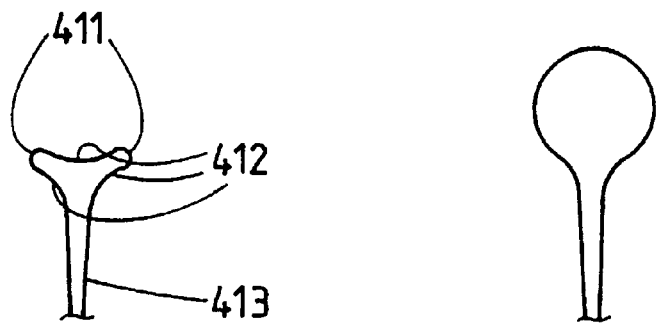
FIG. 11 shows similar sections for a reinforcing rib for a vehicle door pocket.

FIG. 11 shows a mould shape 11(i) for a reinforcing rib for a vehicle door pocket. The shape is based on the letter Y, with tightly radiused ends 411 and concave sections 412 to provide for appreciable expansion on foaming. The foamed shape 11(ii) is symmetrical with respect to a thin wall portion 413, providing the wall of the pocket. If this is to be biased to one side, for instance the inside of the pocket to provide enhanced grippability, the foaming expansion can be arranged to occur whilst the thin wall is still in contact with the outside shape defining part of the mould. For this, the Y 11(iii) may be biased inwards so that the mould face 414 can be arranged to provide a flat surface for the foamed rib 11(iv) to form against.

FIG. 12 shows a mould shape 12(i) for forming a rib 421 on the inside of a thin wall car body panel 422. The mould shape is generally M shaped, with a central concavity 423. This passes over-entre on foaming expansion 12(ii), whereby the rib balloons away from the panel. It should be noted that the rib has a semi-circular shape, which is nevertheless of substantially constant radius of curvature.

As mentioned above, the work which I have carried out on My Original Method has been with polypropylene, using an endothermic blowing agent releasing carbon dioxide gas. Polypropylene is a material which is amorphous above 140° C., its crystallisation temperature. I prefer to inject it at 220° C., so that it flows very readily into the mould and is free to expand in the mould cavity to the extent that this is under-packed. Skinning involves cooling of the material to below the temperature at which crystallisation can occur. I believe that as soon as the skin is urged to stretch by the foaming expansion after mould part withdrawal, the skin is liable to crystallise. Since the pressure which can be exerted by carbon dioxide is limited (it liquefies at 2.24 bar at room temperature), the crystallisation resists substantial stretching of the skin. Even if crystallisation is not the mechanism inhibiting skin stretching, the solidification of the skin does this.

The invention is not restricted to polypropylene. With other materials, which are less prone to crystallisation, more skin stretch may be experienced. Nevertheless, this does not affect the desirability of forming the original skin with excess circumferential length and expanding this to at least part circular form.

Referring to FIG. 13, the hanger there shown has a hook 450, a right arm 451 and a left arm 452. These limbs are all expanded in accordance with the invention to include portions expanded to circular cross-section and having central voids. The hook and right arm have generally C-shaped pre-form shapes 4501, 4511, which expand to circular shapes 4502, 4512. The left arm has a flatter pre-form cross-section 4521, with a central thin land 453. On either side of the land the pre-form has thicker wings 454, which thicken outwards, with a circular contour 455 on the same side as the land 453. The opposite side 456 is complementarily concavely shaped, with a curvature such that it can expand out to continue the convex curvature 455. On expansion, the bi-lobe shape 457 forms, with two circular edges 458 and the central land 453 tangential to these.

Referring to FIG. 14, the article there shown is an eye bath 470, which is elliptical in plan—not shown. The bath has a thin wall 471 and a hollow annular (subject to the elliptical shape) rim 472. The latter is shown at one side of the Figure, whilst the tear drop pre-form shape 473 is shown at the other side. This expands to hollow circular cross-section with a circumferential length 474 equal to that of the tear drop 475. This results in a slight fore-shortening 476 of the height of the eye bath from the height of the pre-form. The eye bath is of flexible polypropylene material, where the rim can deform to the eye socket and seal in eye wash solution in use.

Referring to FIG. 15, the knife 500 there shown has a blade 501 with a thin wall/gauge thickness 502 tapering down to a cutting edge 503, see FIG. 15a. The back of the blade has a thick foamed edge 504 of substantially circular cross-section. This starts at the distal end of the blade and continues into the handle 505, round the distal end 506 of the handle and terminates at a point 507 where the handle has widened to blend with the blade. The handle has a thin web 508 extending along its full length.

It will be appreciated that the knife has high stiffness in bending, not only in the normal cutting plane, due to the I beam configuration of the handle, see FIG. 15b. In the perpendicular plane, the foamed back 504 of the blade and the foaming expansion 509 to the point 507 provide substantial stiffness.

The foaming expansion along the handle and at its distal end provide a comfortable feel to the knife.

Turning to FIGS. 16a and 16b, the cross-sectional shape of the mould cavity for producing the knife is shown. It will be noted that at the edge of the foamed part, the thick section has a peripheral surface 510 which is perpendicular to the central plane 511 of the knife. This plane is the joint plane of the mould for the tool, which is symmetrical about the joint plane. The thick section tapers 512 to the central thin wall of the knife handle and of the knife blade, to provide an adequate surface skin to inflate on foaming expansion to substantially circular cross-section. It should be noted that the cross-sectional height 513 of the handle is greater as moulded than after foaming expansion 514, due to foreshortening of the thick portions on foaming expansion.

FIGS. 17 and 18 show a fork 520. It is of largely conventional shape, with prongs 521, a swan neck 522 and a handle 523. The prongs are foamed. The outer prongs 521' and the edges 524 of the swan neck and the edges 525 of the handle have a continuous foamed rib 526 extending to and terminating at the distal end 527 of the handle. The foaming expansion of the inner two prongs 521" terminates at their root in a thin wall palm section 528 of the fork. At the swan neck 522, a central foamed rib 529 provides added stiffness. This rib extends into the handle and divides into two subsidiary central ribs 529'. The handle thus has three thin wall webs 530. To give the handle a comfortable feel, it is curved in transverse cross-section.

FIGS. 19a, 19b, 19c, 20a, 20b, 20c show typical foamed and corresponding as moulded—prior to foaming—cross-sections.

FIG. 21 shows a spoon 540. It has foamed edges 541 extending from its bowl 542, through its neck 543, and along its handle 544. A central foamed rib 545 extends from the bowl along the handle, to give added stiffness, particularly to the neck.

FIGS. 22a, 22b, 23a, 23b, show typical foamed and corresponding as moulded—prior to foaming—cross-sections.

FIGS. 24 and 25 show another spoon 550. This has a modified invert channel section handle 551, with lateral flanges 552, which are of thin wall thickness, and a foamed central web 553.

FIGS. 26a, 26b, 27a, 27b, show typical foamed and corresponding as moulded—prior to foaming—cross-sections.

Figure 31:
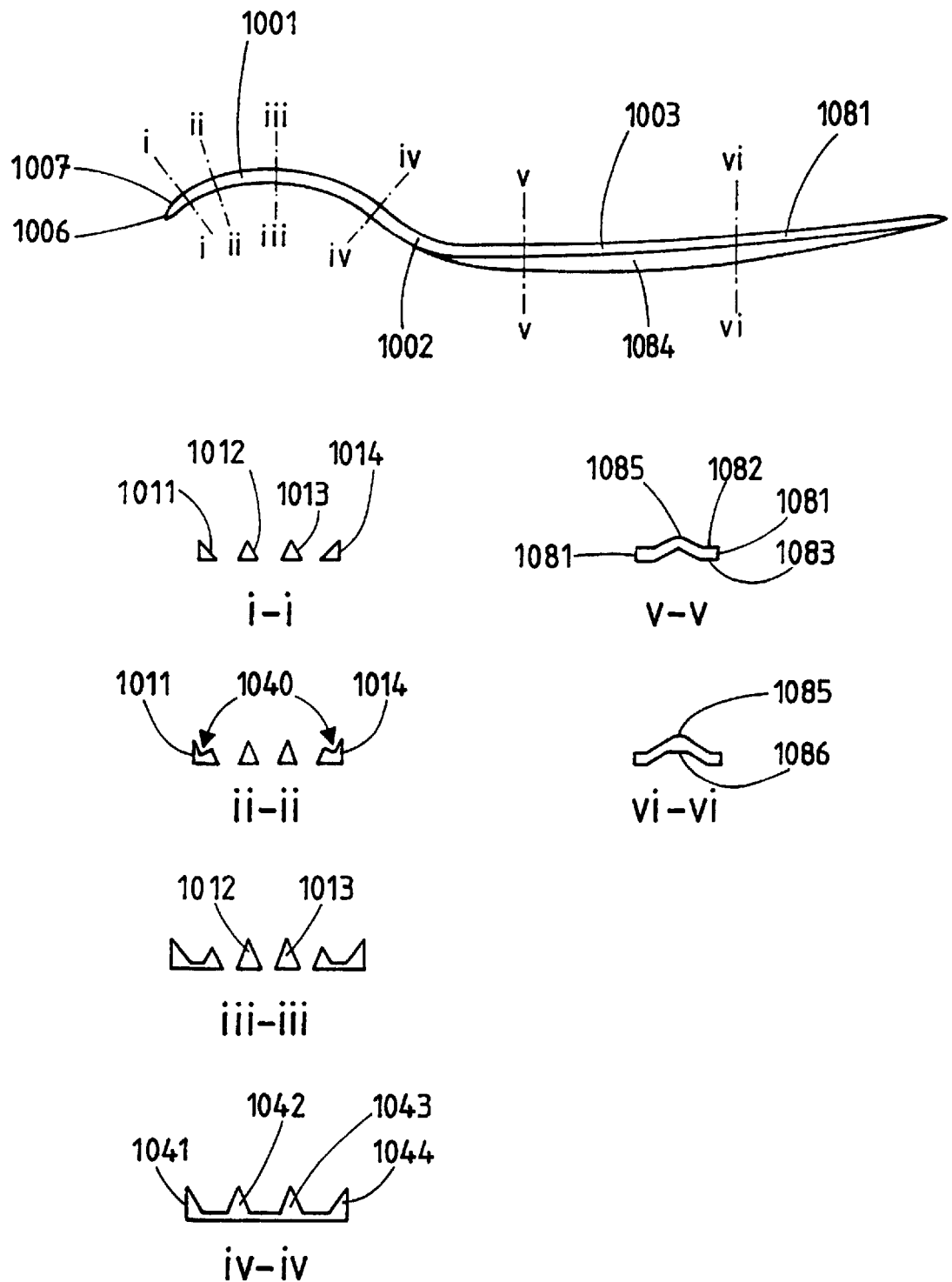
FIG. 31 is a side view of a fork as moulded, i.e. of the mould cavity shape, with a series of views showing cross-sectional shape.
Figure 32:
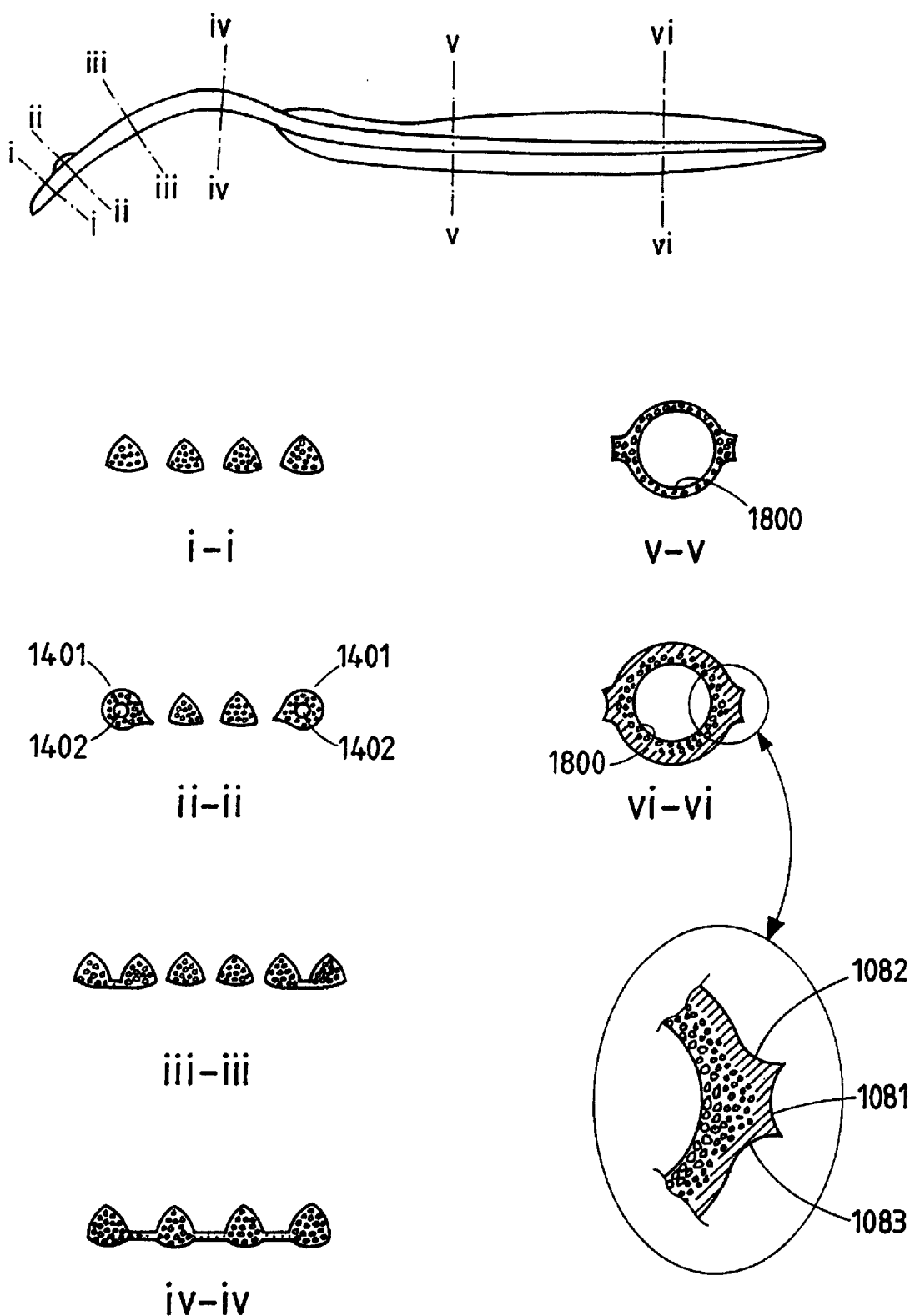
FIG. 32 is a similar side view of the finish formed fork, with the same series of cross-sectional views showing the shape after foaming expansion and an enlarged scrap view of one cross-section.

Referring to FIG. 31, it should be noted that not only is the shape shown that of the mould cavity, it is also the shape of a fork moulded in the cavity without foam producing additive, whereas the shape of the fork shown in FIG. 32 is one from the same mould cavity with foam producing additive in the plastics material.

In general terms, the fork has a set of prongs 1001, a swan neck 1002 and a handle 1003. The prongs 1001 have extensions 1004 into the swan neck, which has web areas 1005 between the extensions. The extensions 1042, 1043 of the inner two prongs 1012, 1013 extend back to the forward end of the handle. Similarly, the extensions 1041, 1044 of the outer two prongs 1011, 1014 extend back peripherally of the swan neck to the handle. In addition, the two outer prongs 1011, 1014 have extra extensions 1411, 1441, which branch from the prongs close to their outer ends and extend back into the swan neck between the peripheral extensions 1041, 1044 and the inner prongs' extensions 1042, 1043. The extra extensions taper out before reaching the handle.

As apparent from the cross-sectional views in FIG. 31, the prongs taper to pointed ends 1006. The inner prongs 1012, 1013 and their extensions 1042, 1043 are of constant, equilateral triangle cross-section behind the tapers 1007 of the ends 1006. The web areas on either side of the extensions 1042, 1043 are an order of magnitude thinner than the cross-sectional dimensions of the extensions, and so can be ignored as regards effect on the foamed shape. The extra extensions 1411, 1441 also are of equilateral cross-section. The outer prongs 1011, 1014 and their extensions 1041, 1044 are of right angle triangle shape of height—from the web areas—equal to the inner prongs. The handle shape is more complex. Essentially it is square edged 1081, with narrow top and bottom returns 1082, 1083 extending in from the edges at right angles. The main extent 1084 of the top is symmetrically ramped up to a central rounded top ridge 1085. The bottom is of complementary shape 1085, except that it has a central flat 1086. The top is thus convex and the bottom is concave.

Referring now to FIG. 32, the foamed shape of the fork is as follows:

The very ends of 1006 of the prongs are of solid plastics material. Where the tapers 1007 reach a certain thickness, foaming is present in their centre, although without any apparent change in shape from the FIG. 31 shape. However where the full section is reached, surfaces of the prongs and their extensions bow out, as the internal foam pressure inflates them to maximise the internal volume of the cross-section. However the initial skin shape gives little scope for marked increase in the internal volume. The result is that almost the entire extent of the prongs and their extension is of cellular phase. The first exceptions are the points 1006. The second exceptions are the regions of intersection of the outer prongs 1011, 1014 with their extra extensions 1411, 1441. At the intersections, regions 1040 of sharp convexity are formed in the original skin, which enables a substantial expansion in the internal volume of the moulding at the regions. FIG. 32 shows that this results in a substantially circular cross-section 1401 with a central void or hollow 1402 developing. The original skin shape was complex, with sharp features. These are not entirely smoothed out, so that the cross-section has discontinuities in the circular shape.

The handle also has a concavity in its original skin shape, in the form of the shape 1085. Thus this can invert to substantially circular cross-section on foaming expansion and a central hollow 1800 develops. The width of the handle is much greater than the width of the outer prongs at the junction with their extra extensions. Thus the handle expands to a much bigger diameter. Whilst the hollow 1402 has a void of the same order of cross-sectional dimension as the skin thickness, the central void in the handle is an order of magnitude larger than the skin thickness.

As shown in the detail to cross-section vi—vi, the right angle features in the initial skin shape between the edges 1081 and the returns 1082, 1083 remain in final cross-section, but the edges and returns become local concave features as a result of the overall inflation of the cross-section.

Figure 2:
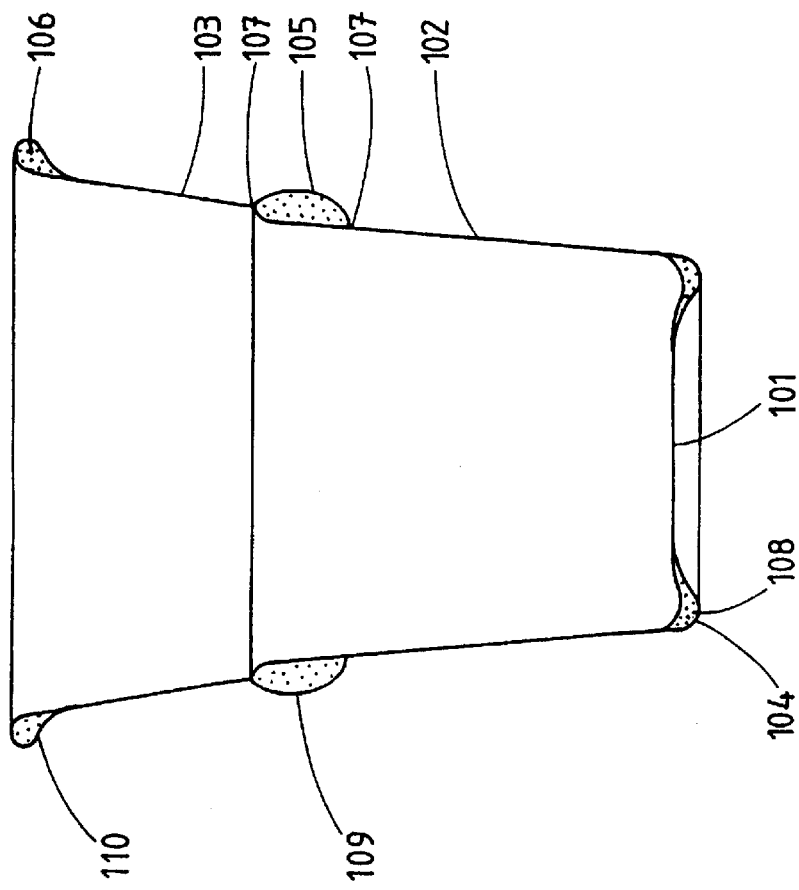
Figure 1:
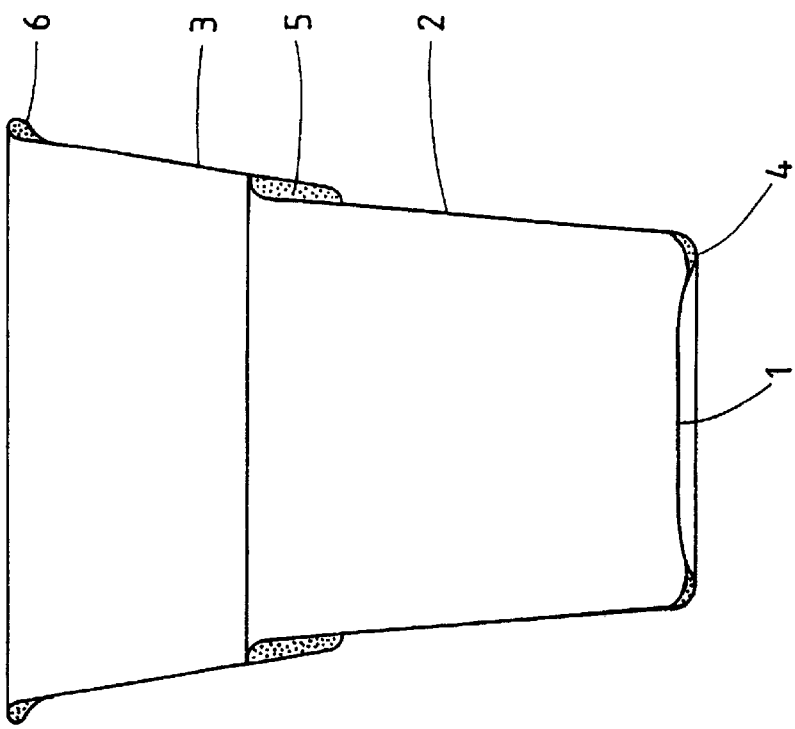
Figure 3:
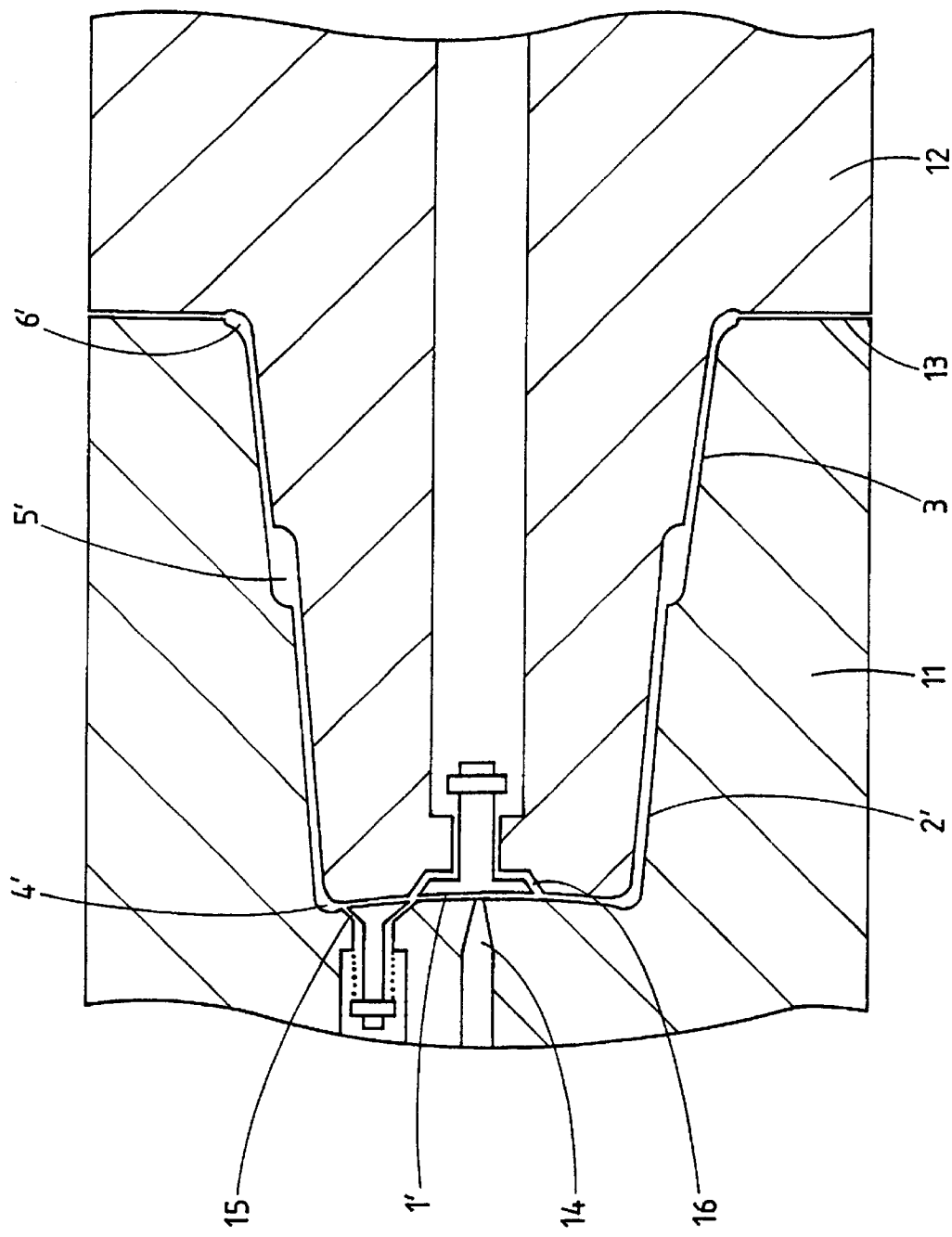
Figure 5:
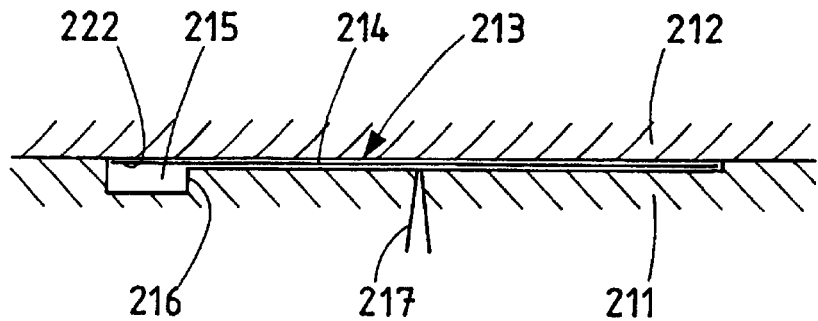
Figure 6:
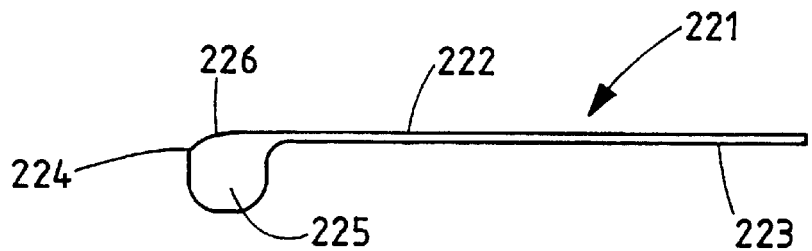
Figure 7:
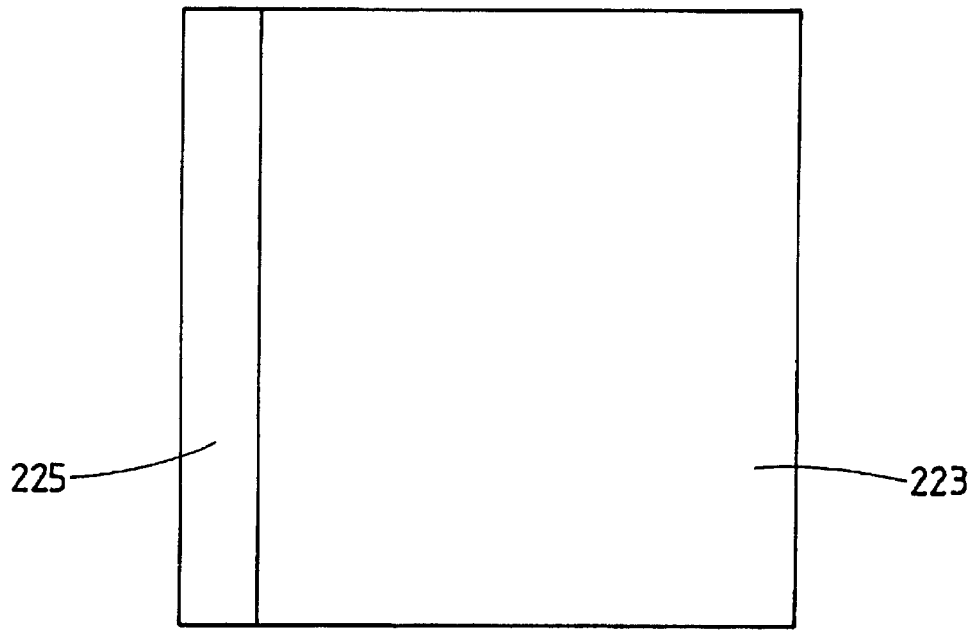

Measurements have indicated a 3% stretch only from the skin of the handle as moulded to its FIG. 2 state, when using polypropylene.

Referring now to FIGS. 34 & 35, the mould there shown if for a handle for an implement whose operative portion is not shown. The mould cavity has a large diameter distal end 2001 and a small diameter proximal end 2002 at which the mould would be extended for the non-shown operative portion of the implement. Between the ends, the cavity has straight sides 2003, which approach each other. The mould has a uniform gap 2004, corresponding to the wall thickness of a handle to be moulded if plastics material without foam producing additive is used. Small central and peripheral grooves 2005, 2006 are cut into two parts 2007, 2008 of the mould.

Figure 36:
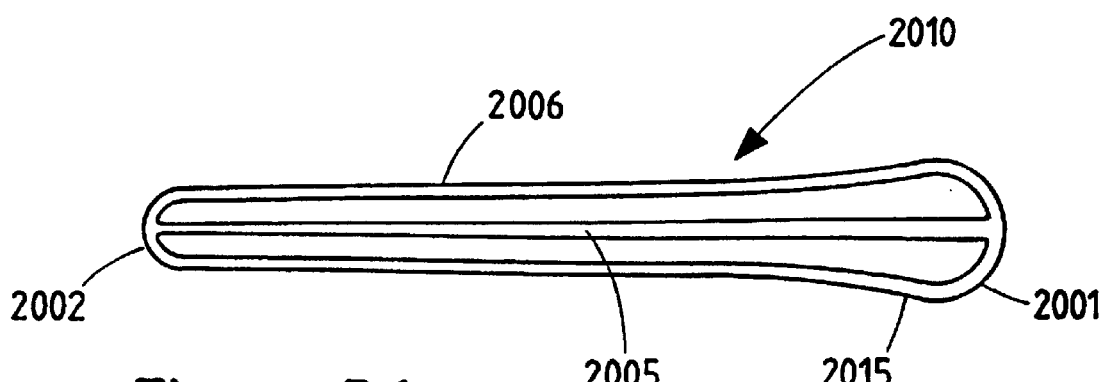
FIG. 36 is plan view of the handle.

The handle 2010 moulded with foam producing additive is shown in FIGS. 36, 37 & 38. On injection, the skin 2011 is formed at the internal surface of the cooled mould, which imparts the initial skin shape. On opening of the mould prior to complete cooling of the plastics material at the centre of the moulding, the material expands by foaming to the shape shown. It should be noted that the skin does not appreciably extend in length or surface area; rather, it is inflated to shape. The skin is smooth on the outside, with no foam bubbles forming at the surface, because this solidifies whilst the moulding pressure is maintained and inhibiting foaming. However within the skin, bubbles or cells 2012 are present. These increase in size until the central void 2013 is reached. Throughout most of its length, the handle has a circular cross-section as shown in FIG. 38. The outer surface is not truly circular, having the shape of the grooves 2005, 2006—albeit somewhat deformed to the circular shape. Where the cross-section is circular, the sides 2003 are straight; although it should be noted that they are closer together than originally. At the large diameter end 2001, the curved shape into which the skin is formed initially inhibits the full circular cross-section from developing. Thus the thickness 2014 of the handle at its centreline progressively decreases close to the end. The result is that the sides 2003 curve gently out 2015 to meet the curvature of the end. The thickness 2014 begins to decrease from the same position as the sides curve out. Similar effects occur at the small diameter end 2002, but they are not so prominent.

Turning now to FIG. 39, the effect on the cross-sectional shape at the longitudinal centre of the handle can be seen, when the mould parts 2007, 2008 are opened to a limited extent 2020 only until the handle has set. It expands against the mould parts, which impress their central shape on the handle, that is to say the flat surface of the mould part 2008 and the similar surface with the central groove 2005 in the case of the other mould part 2007. This has the advantage of spreading the edges 2003, with consequential increase in moment of inertia; but the disadvantage of increasing cycle time due to the time taken in holding the mould parts partially withdrawn for the expansion to occur. A similar effect can be achieved with expansion in free air by reducing the amount of foam producing additive in the plastics material mixture, as shown in FIG. 40. In this case the cross-sectional shape does not develop to a full circular shape, but approximates to an elliptical shape 2030. This shape can be produced with the same cycle time as with the shape of FIGS. 35, 36 & 37.

Turning now to FIGS. 41, 42 and 43, there is shown another fork 2101 with a pronounced curvature of its swan neck 2102, with a local radius of curvature 2103. A characteristic of the invention particularly where voids are blown, is that the relevant portion of the article tends to straighten, as with inflation of a child's balloon. This fork incorporates edge flanges 2104 in the swan neck, which extend radially, that is transversely of a wall 2105 extending through the swan neck. The pre-form—FIG. 43a—of the swan neck has a concavity 2106 facing in from each flange and extending along a narrow web 2107 between each flange and the wall 2105. On expansion, the concavity's skin passes over centre. However, since it is facing essentially laterally and its height in radial direction does not increase, there is little tendency for the expansion to straighten the swan neck. This effect is enhanced if the fork is held on the tool whilst the expansion occurs, with the skin 2108 of the web and flange in contact with the tool being kept relatively rigid by cooling from the tool. The central tines 2110 of the fork also incorporate curvature limiting flanges 2111, at least at their roots. These flanges have webs 2112 and lateral concavities 2113 at each side. Further, the webs have a groove 2114—formed by a rib in the tool—extending into the flange. This groove is kept cool during expansion, so that not only does it not invert and expand, but also the groove helps to maintain the curvature of the tines.

Turning on to FIG. 44, there is shown a pre-form and expanded cross-section of a knife blade. The pre-form is stepped 2201 in thickness from the wall thickness of the blade 2202. The back 2203 of the blade is of C-shaped cross-section. On expansion, a void 2204 develops at the back, with the skins 2205 of the thicker wall being pulled apart as far as the step 2201. With excess of blowing agent and a relatively short cooling time before the expansion is initiated, the expansion will be to circular cross-section with the step 2201 being within the circular circumference. However, control of the blowing agent quantity and cooling time, the expanded cross-section as shown will develop, with a semicircular shape tapering in to the step 2201. The void 2204 develops at the back and a cellular phase is present between the skins 2205, at least adjacent the step 2201.

What is claimed is:

1. A method of forming an article via injection of plastics material into a mould, the finish formed article having at least one portion expanded, by blowing agent, to a shape which in cross-section is at least substantially circular over at least a substantial part of its circumference, the circumference having a predetermined extent, the method consisting in the steps of:

providing a mould tool defining in its closed state, between opposite parts, at least one region having a circumferential extent around the region in transverse cross-section substantially equal to the predetermined circumference;

closing the mould and injecting a plastics material mixture comprising a basic polymer and a blowing agent into the mould tool;

allowing the plastics material to skin adjacent thereof with an extent substantially equal to the predetermined circumference;

withdrawing at least a portion of one part of the mould tool from the other part before the plastics material mixture has at least substantially solidified at the said region(s) of the mould tool to allow the mixture injected therein to expand by action of the blowing agent to the said at least partially, at least substantially circular shape and form the said portion(s) of the finish formed article; and ejecting the article from the mould tool.

2. A method of forming an article as claimed in claim 1, wherein the expansion occurs after ejection of the article from the mould tool.

3. A method of forming an article as claimed in claim 1, wherein the expansion occurs before ejection of the article from the mould tool.

4. A method of forming an article as claimed in claim 1, wherein the expansion is to an extent whereby a substantially even radius of curvature of the skin is present over a major arc or preferably the entire circumference of the said portion(s).

5. A method of forming an article as claimed in claim 1, wherein the or each said region is wider than it is thick and the withdrawal step is delayed from a point in the cycle time when the expansion would be to an extent whereby a substantially even radius of curvature of the skin is present over substantially the entire circumference of the article in the said portion(s), whereby the skin stiffens to such extent that edges of the expanded portion substantially reproduce the corresponding edges of the mould region(s), whilst the intervening sides are bowed to at least partial, at least substantially circular shape, the said portion(s) tending to elliptical shape.

6. A method of forming an article as claimed in claim 1, wherein the expansion occurs against a mould tool surface, whereby the said portion of the finish formed article includes a face from which the transverse section of the portion extends with partially circular curvature.

7. A method of forming an article as claimed in claim 1, wherein the said portion(s) comprise the entire finish formed article.

8. A method of forming an article as claimed in claim 1, wherein the said portion(s) adjoin thin wall portion(s) of the article, with transitional curvature occurring between the expanded portion(s) and the thin wall portion(s), the mould withdrawal having occurred after the plastics material has substantially solidified throughout the thin wall portion(s) of the article.

9. A method of forming an article as claimed in claim 8, wherein the expanded portion(s) are biased to one side of the thin portion(s) by contact with a mould part whilst the expansion occurs, whereby the transitional curvature is asymmetric with respect to the thin wall portion(s).

10. A method of forming an article as claimed in claim 1, wherein the said region(s) and the said portion(s) are at least partially elongate, having a constant cross-section.

11. A method of forming an article as claimed in claim 1, wherein the said region(s) of the mould may have a cross-sectional shape having one or more marked discontinuities of contour.

12. A method of forming an article as claimed in claim 11, wherein the or each discontinuity is a sharp corner, the sharp corner preferably being slightly relieved to alleviate vestigial traces in the final skin shape.

13. A method of forming an article as claimed in claim 11, wherein the or each discontinuity is a tight radius of curvature which is tight compared with that of the transverse cross-section of the corresponding portion of the finish formed article.

14. A method of forming an article as claimed in claim 11, wherein the discontinuity is at a feature of the region(s) causing locally accentuated cooling whereby the feature is locally frozen into the skin at the least partial, at least substantially circular shape of the said portion of the finish formed article.

15. A method of forming an article as claimed in claim 1, wherein the said region(s) have an appreciable difference in transverse dimension taken normally to each other, whereby the longer transverse dimension fore-shortens on expansion.

16. A method of forming an article as claimed in claim 1, wherein the said region(s) have at least one marked concavity, whereby the corresponding skin concavity is inverted on expansion to provide at least one characteristic dimension of the cross-section of the region(s) which substantially increases on expansion.

17. A method of forming an article as claimed in claim 16, wherein the or each region includes a plurality of concavities and a central part of the region acting as a reservoir of molten plastic material mixture for the expansion.

18. A method of forming an article as claimed in claim 1, wherein the or each said region is curved—with a local radius of curvature which is large in comparison with the dimensions of its cross-section—and defines a flange extending radially and at least one laterally facing concavity, whereby the concavity inverts substantially laterally on expansion.

19. A method of forming an article as claimed in claim 18, wherein the or each region defines a web from which the flange extends, the web remaining in cooling contact with one of the mould parts during the expansion.

20. A method of forming an article as claimed in claim 19, wherein the or each region includes a radially extending rib defining a groove in the or each web on expansion, the rib remaining in cooling contact with its groove.

21. A method of forming an article as claimed in claim 1, wherein the said portion(s) are expanded to such extent that a void forms centrally thereof, and the skin surrounding the void is preferably cellular.

22. A method of forming an article as claimed in claim 21, wherein the withdrawal step allows heat soak from a central part of the portion(s) to warm and soften the chilled skin of the portion(s), which formed prior to withdrawal, and/or thicken a melt layer within the portion(s), whereby expansion to form the void occurs after a perceptible delay.

23. A method of forming an article as claimed in claim 22, wherein the said region(s) include a local thickening of cross-section to increase locally the heat soak effect and initiate the expansion.

24. A method of forming an article as claimed in claim 21, wherein the or each region and its corresponding portion is elongate, with expansion initiating at one point and spreading along the corresponding portion(s) of the article.

25. A method of forming an article as claimed in claim 1, wherein the mould tool includes at least one other region having a lesser circumferential extent, whereby on mould withdrawal and expansion, the one region(s) expand to such extent that a void forms centrally thereof and the other region(s) expand only to such extent that a cellular structure forms centrally thereof.

26. A method of forming an article as claimed in claim 1, wherein prior to closure of the mould a substrate is placed with one side against the surface of the mould at the said region(s), whereby on injection of the plastics material mixture the latter covers the opposite side of the substrate and on withdrawal the plastics material mixture expands at the opposite side of the substrate, drawing the substrate into a curve towards this side.

27. A method of forming an article as claimed in claim 26, wherein the mould defines narrow and wide gap portions, the latter being at the said region(s) and the substrate extends into the narrow gap portions, and the withdrawal step is delayed until the plastics material mixture has at least substantially solidified in the narrow gap portion(s), whereby the expansion of the plastics material does not curve the substrate here.

28. A method of forming an article as claimed in claim 1, wherein the mould tool has two symmetrical mould parts.

29. A mould tool for use in the method of claim 1.

30. A mould tool as claimed in claim 29, wherein the said circumferential extent around the said region is such as to allow an increase on expansion in excess of 5 mm, whereby a central void can be formed in an article formed with the tool.

31. A method of forming an article via injection of plastics material into a mould, the finish formed article having thin wall portion(s) and thick wall portion(s), the thick wall portion(s) being at least partially foamed, the method consisting in the steps of:

provide a mould tool defining in its closed state, between its two opposite parts, narrow gap portion(s) whose mould part gap is to be substantially reproduced in the thin wall portion(s) of the article and wide gap portion(s) whose mould part gap is less than the thickness of the thick wall portion(s) of the finish formed article, the two opposite mould parts being symmetrical;

closing the mould tool to define the narrow and wide gap portions;

injecting a plastics material mixture comprising a basic polymer and a foam producing additive into the mould tool;

allowing the plastics material mixture to at least substantially solidify in the narrow gap portions of the mould tool to produce the thin wall portions of the finish formed article;

withdrawing at least a portion of one part of the mould tool from the other part before the plastics material mixture has at least substantially solidified in the wide gap portion(s) of the mould tool to allow the mixture to expand by foaming and form at least some of the thick wall portion(s) of the finish formed article; and ejecting the article from the mould tool.

32. A method of forming an article as claimed in claim 1, wherein one or more filler is added to the plastics material mixture.

33. A plastics material article formed by the method of claim 1.

34. A plastic material article as claimed in claim 33, wherein the entire article has been expanded by blowing agent.

35. A plastics material article as claimed in claim 33, wherein an entire part of the article has been expanded by blowing agent.

36. A plastics material article as claimed in claim 35, wherein the article includes an annular portion expanded to circular cross-section with a central void.

37. A plastics material article as claimed in claim 36, wherein the article is of soft plastics material and the annular portion is adapted to act as a seal.

38. A plastics material article as claimed in claim 37, wherein the article is a small container adapted to be an eye bath, with the annular region being deformable to seal to the eye socket.

39. A plastics material article as claimed in claim 33, wherein a part of the article has two or more portions which have been expanded by blowing agent and non-expanded, portion(s) therebetween, preferably with the two portions joining at a distal end of the part.

40. A plastics material article as claimed in claim 33, wherein the article is or includes an expanded or partially expanded handle.

41. A plastic material article as claimed in claim 40, wherein the article is a piece of cutlery, of which the handle has one or more expanded or partially expanded portion(s).

42. A plastics material article as claimed in claim 41, wherein the article is a knife, with an expanded portion extending from the handle along the back of the blade.

43. A plastics material article as claimed in claim 42, wherein the knife handle is expanded to circular cross-section with an internal void and the blade back expanded portion is cellular and not fully circularly expanded.

44. A plastics material article as claimed in claim 42, wherein the knife handle is expanded to flattened circular cross-section with an internal void and the blade back expanded portion is cellular and not fully circularly expanded.

45. A plastics material article as claimed in claim 41, wherein the article is a fork with an expanded portion extending from the handle through the swan-neck and expanded portions extending from the swan-neck to the tines.

46. A plastics material article as claimed in claim 45, wherein the fork handle is expanded to circular cross-section with an internal void and the tines expanded portions are cellular and not fully circularly expanded.

47. A plastics material article as claimed in claim 41, wherein the article is a spoon with expanded portions extending from the handle along opposite sides of the bowl.

48. A plastics material article as claimed in claim 47, wherein the spoon handle is expanded to circular cross-section with an internal void and the bowl side expanded portions are cellular and not fully circularly expanded.

49. A plastics material article as claimed in claim 33, wherein the article is a garment hanger.

50. A plastics material article as claimed in claim 49, wherein the hanger has a hook which is expanded to circular cross-section with a central void.

51. A plastics material article as claimed in claim 49, wherein the hanger has arms which are expanded to circular cross-section with a central void.

52. A plastics material article as claimed in claim 49, wherein the hanger has arms having two portions expanded to circular cross-section with a central void, and having with an intermediate land of non-expanded plastics material.

53. A plastics material article as claimed in claim 52, wherein the land is substantially tangential to the two expanded arm portions.

54. A mould tool for forming the pre-form prior to expansion of the article of claim 33.

* * * * *

UNITED STATES PATENT AND TRADEMARK OFFICE
CERTIFICATE OF CORRECTION

PATENT NO. : 6,402,725 B1
DATED : June 11, 2002
INVENTOR(S) : Peter R. Clarke

It is certified that error appears in the above-identified patent and that said Letters Patent is hereby corrected as shown below:

Column 1,
Line 18, "lest" should be -- least --

Column 3,
Line 32, "blows" should be -- bows --

Column 12,
Lines 56 and 57, "BEST MODE..." should be deleted

Column 13,
After line 2, the heading -- "BEST MODE FOR CARRYING OUT THE INVENTION" -- should be inserted Column 14,
Line 17, "over-entree" should be -- over-centre --

Column 17,
Line 17, "if" should be -- is --

Signed and Sealed this

Thirty-first Day of December, 2002

JAMES E. ROGAN
*Director of the United States Patent and Trademark Office*